(12) United States Patent
Roy et al.

(10) Patent No.: US 11,295,745 B1
(45) Date of Patent: Apr. 5, 2022

(54) MULTI-TASKING AND SKILLS PROCESSING

(71) Applicant: Amazon Technologies, Inc., Seattle, WA (US)

(72) Inventors: Shiladitya Roy, Bellevue, WA (US); Bo Li, Kenmore, WA (US); Vikram Kumar Gundeti, Bellevue, WA (US); Eswara Jnana Swaroop Bhupathiraju, Bellevue, WA (US); Nathan G. Leupold, Issaquah, WA (US); Andrew S. Huntwork, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 186 days.

(21) Appl. No.: 16/560,103

(22) Filed: Sep. 4, 2019

(51) Int. Cl.
| | |
|---|---|
| *G10L 15/22* | (2006.01) |
| *G10L 15/30* | (2013.01) |
| *G06F 3/16* | (2006.01) |
| *G10L 15/18* | (2013.01) |

(52) U.S. Cl.
CPC ............ *G10L 15/222* (2013.01); *G06F 3/167* (2013.01); *G10L 15/1822* (2013.01); *G10L 15/30* (2013.01); *G10L 2015/223* (2013.01); *G10L 2015/228* (2013.01)

(58) Field of Classification Search
CPC ... G10L 15/222; G10L 15/1822; G10L 15/30; G10L 2015/223; G06F 3/167
See application file for complete search history.

(56) References Cited

U.S. PATENT DOCUMENTS

| | | | |
|---|---|---|---|
| 6,098,043 A * | 8/2000 | Forest | G10L 15/26 |
| | | | 379/88.01 |
| 8,732,289 B2 * | 5/2014 | Li | H04L 41/0883 |
| | | | 709/223 |
| 9,654,175 B1 | 5/2017 | Lowrie et al. | |
| (Continued) | | | |

FOREIGN PATENT DOCUMENTS

WO    WO-2018085671 A1 *  5/2018  ........... H04L 67/306

OTHER PUBLICATIONS

The Examiner's attention is hereby drawn to the specification and file history of U.S. Appl. No. 15/271,462, titled "Maintaining Context for Voice Processes", filed Sep. 21, 2016.

*Primary Examiner* — Daniel C Washburn
*Assistant Examiner* — Athar N Pasha
(74) *Attorney, Agent, or Firm* — Pierce Atwood LLP

(57) ABSTRACT

Described herein is a system for enabling a user to multitask by allowing a user to pause or interrupt an on-going interaction with a skill. The system monitors a state of a skill session, and updates the state to allow the user or system to suspend the session. The user may provide an instruction to pause an active session, causing the system to place the session in a suspended state. The user may then provide an instruction to resume the suspended session, causing the system to place the session in an active state. In other cases, the user input may be a request during an active session that requires invoking another skill. The system may place the current session in a suspended state, and invoke a second skill session to monitor the interaction with a second skill. When the interaction with the second skill is completed, the system may resume the previous session by placing it in an active state.

22 Claims, 19 Drawing Sheets

(56) References Cited

U.S. PATENT DOCUMENTS

| | | | |
|---|---|---|---|
| 9,972,318 B1* | 5/2018 | Kelly | G10L 15/22 |
| 2010/0225450 A1 | 9/2010 | Fischer et al. | |
| 2011/0170692 A1* | 7/2011 | Konrad | H04L 9/0825 |
| | | | 380/260 |
| 2012/0102493 A1* | 4/2012 | Allen | G06F 9/4881 |
| | | | 718/101 |
| 2013/0074067 A1* | 3/2013 | Chowdhry | G06F 9/485 |
| | | | 718/1 |
| 2013/0096921 A1* | 4/2013 | Kuwamoto | G08G 1/0962 |
| | | | 704/260 |
| 2016/0028878 A1 | 1/2016 | Davis et al. | |
| 2017/0127135 A1 | 5/2017 | Chung et al. | |
| 2017/0180504 A1 | 6/2017 | McFall et al. | |
| 2017/0244798 A1* | 8/2017 | DeLuca | H04L 67/26 |
| 2017/0251046 A1 | 8/2017 | Lowrie et al. | |
| 2017/0330479 A1 | 11/2017 | Bowman et al. | |
| 2018/0032610 A1 | 2/2018 | Cameron et al. | |
| 2019/0171604 A1* | 6/2019 | Brewer | G06F 9/3851 |

* cited by examiner

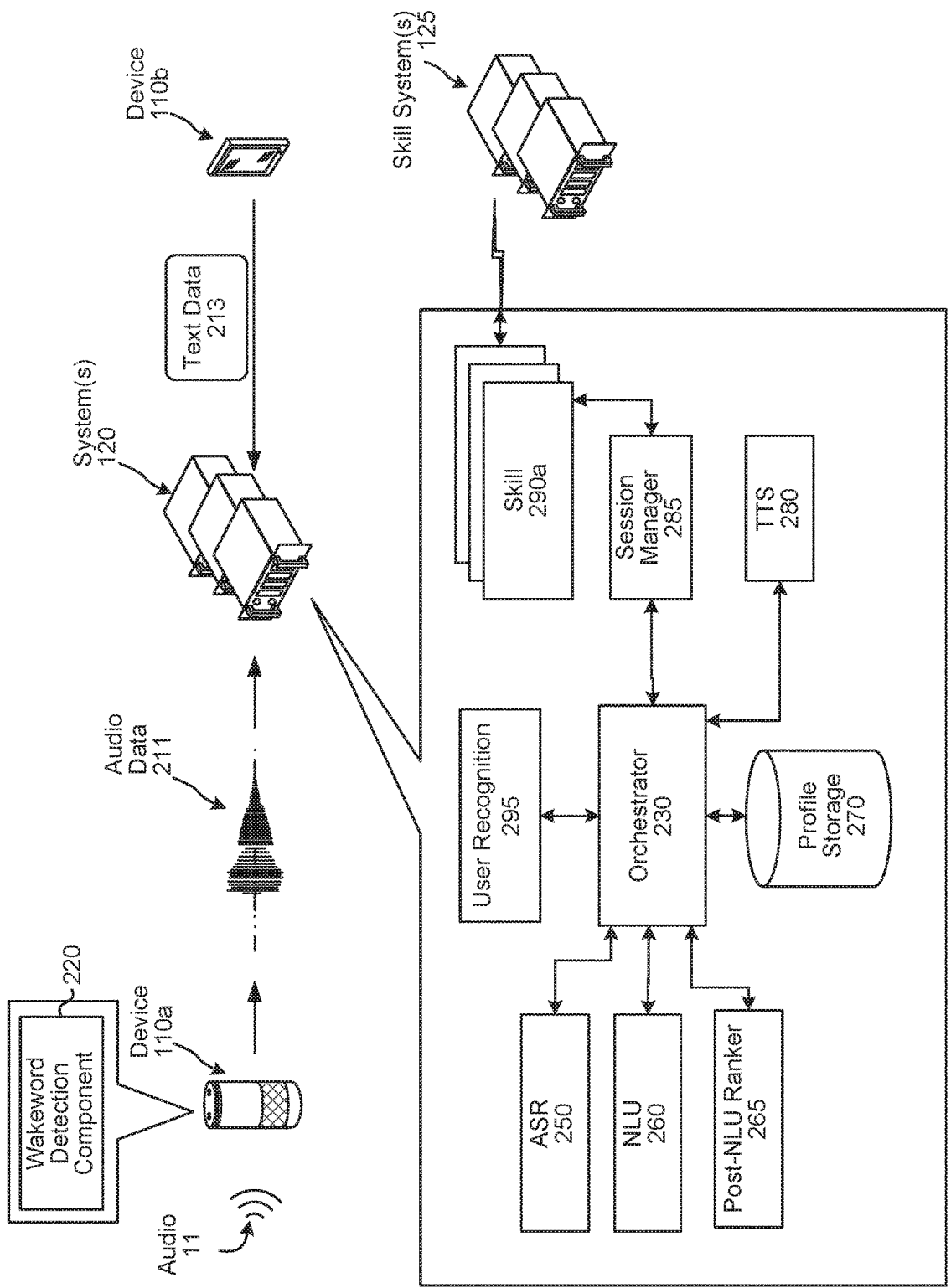

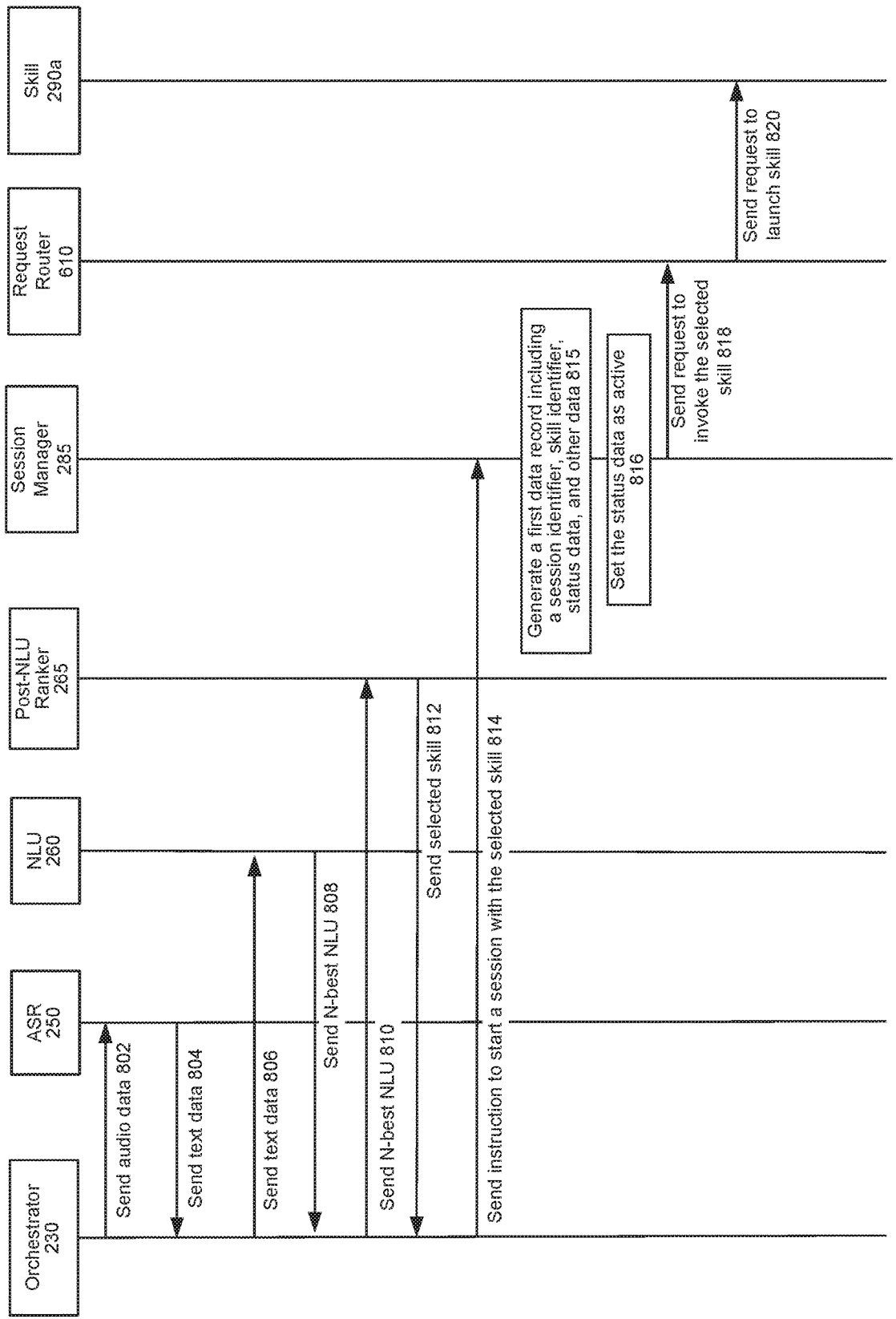

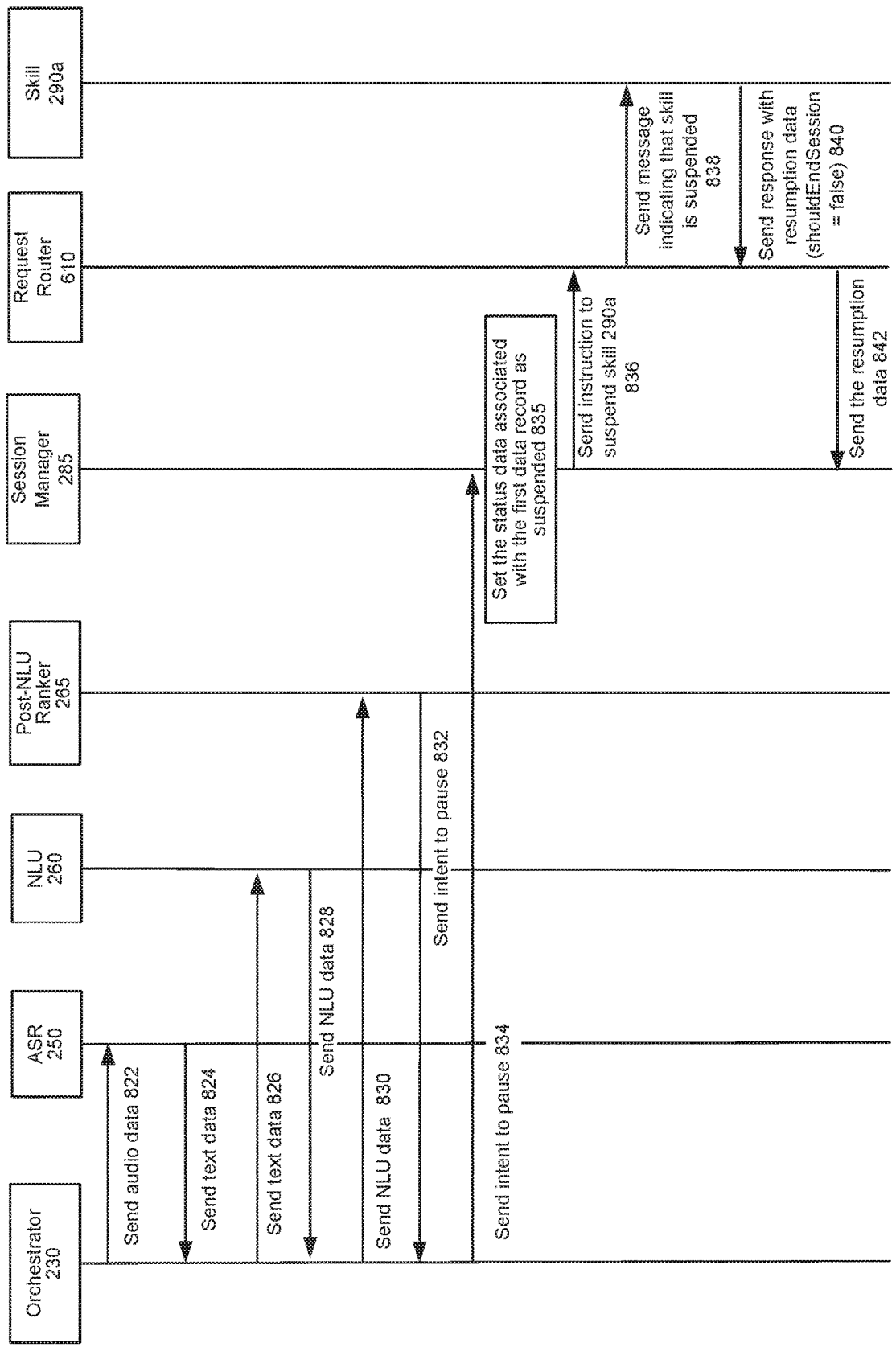

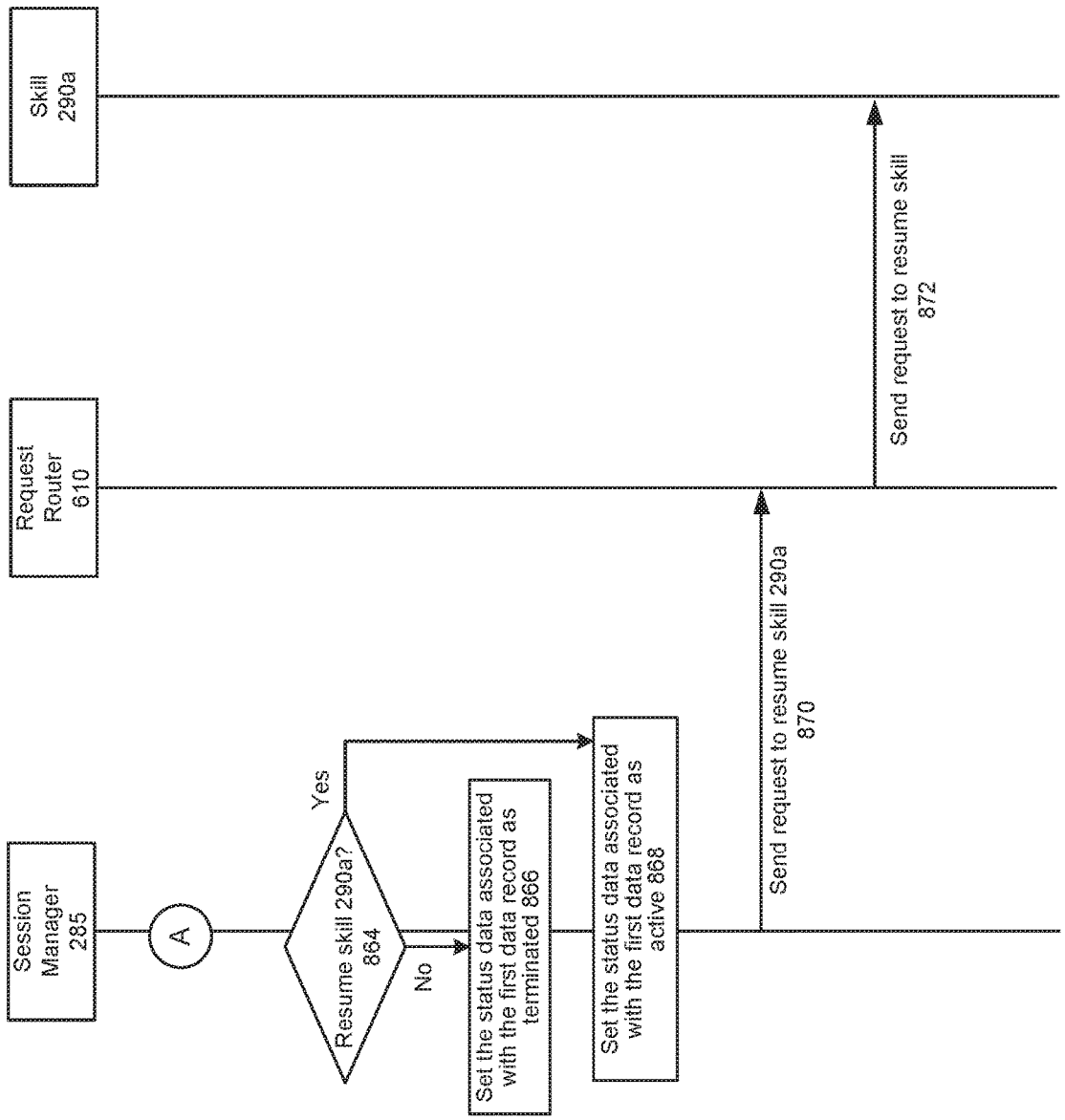

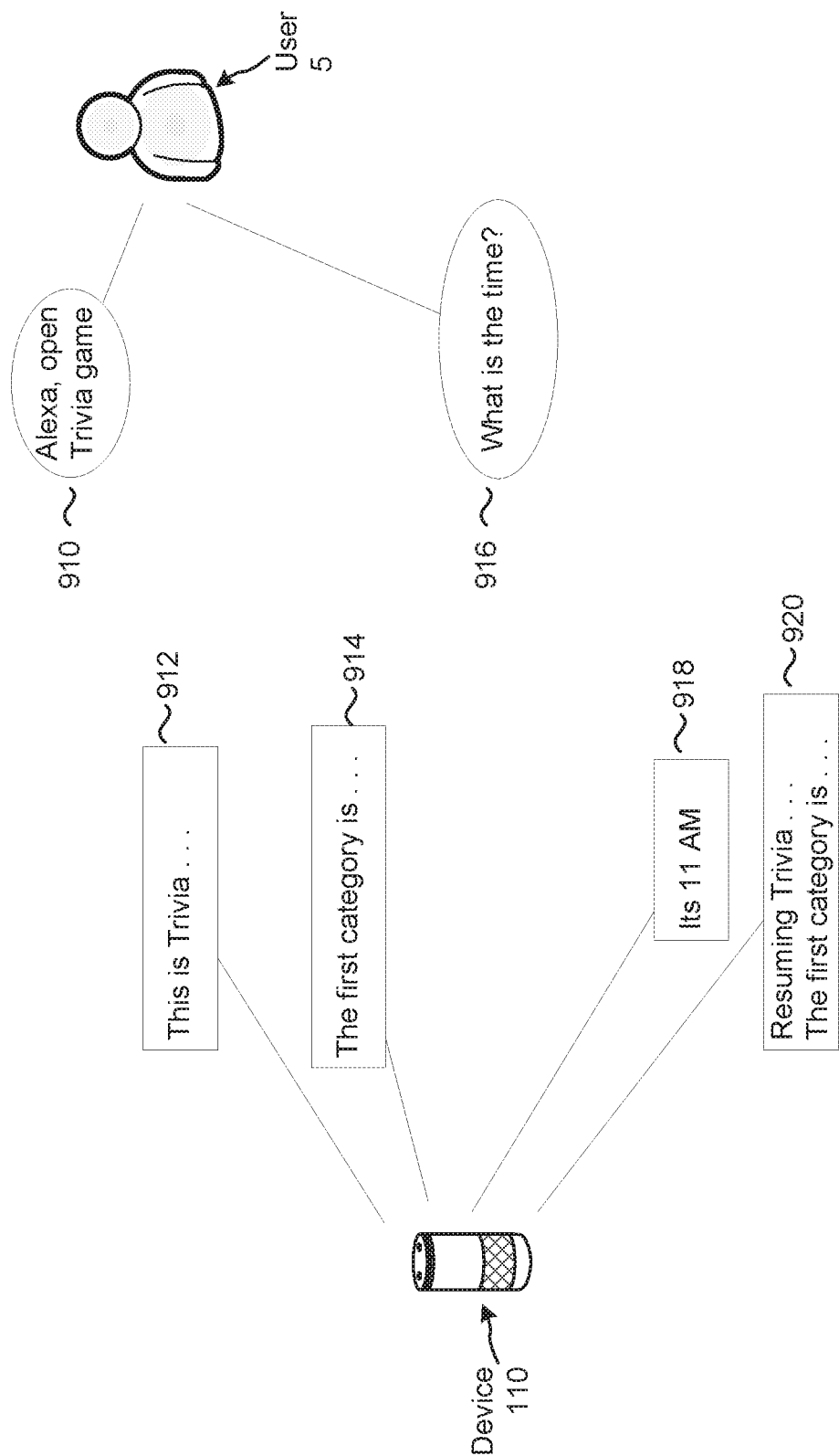

MULTI-TASKING AND SKILLS PROCESSING

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and/or natural language understanding processing techniques, or other techniques or combination thereof used to interpret input audio data is referred to herein as speech processing. Speech processing may also involve converting a user's speech into text data that may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 2A is a conceptual diagram of components of a system according to embodiments of the present disclosure.

FIG. 8A is a signal flow diagram illustrating how a user request requiring invocation of a skill is processed according to embodiments of the present disclosure.

FIG. 8B is a signal flow diagram illustrating how a user request requiring pausing of a skill is processed according to embodiments of the present disclosure.

FIG. 8D is a signal flow diagram illustrating how a skill is resumed according to embodiments of the present disclosure.

FIGS. 9A and 9B illustrate a user interaction with a system according to embodiments of the present disclosure.

DETAILED DESCRIPTION

Figure 1A:
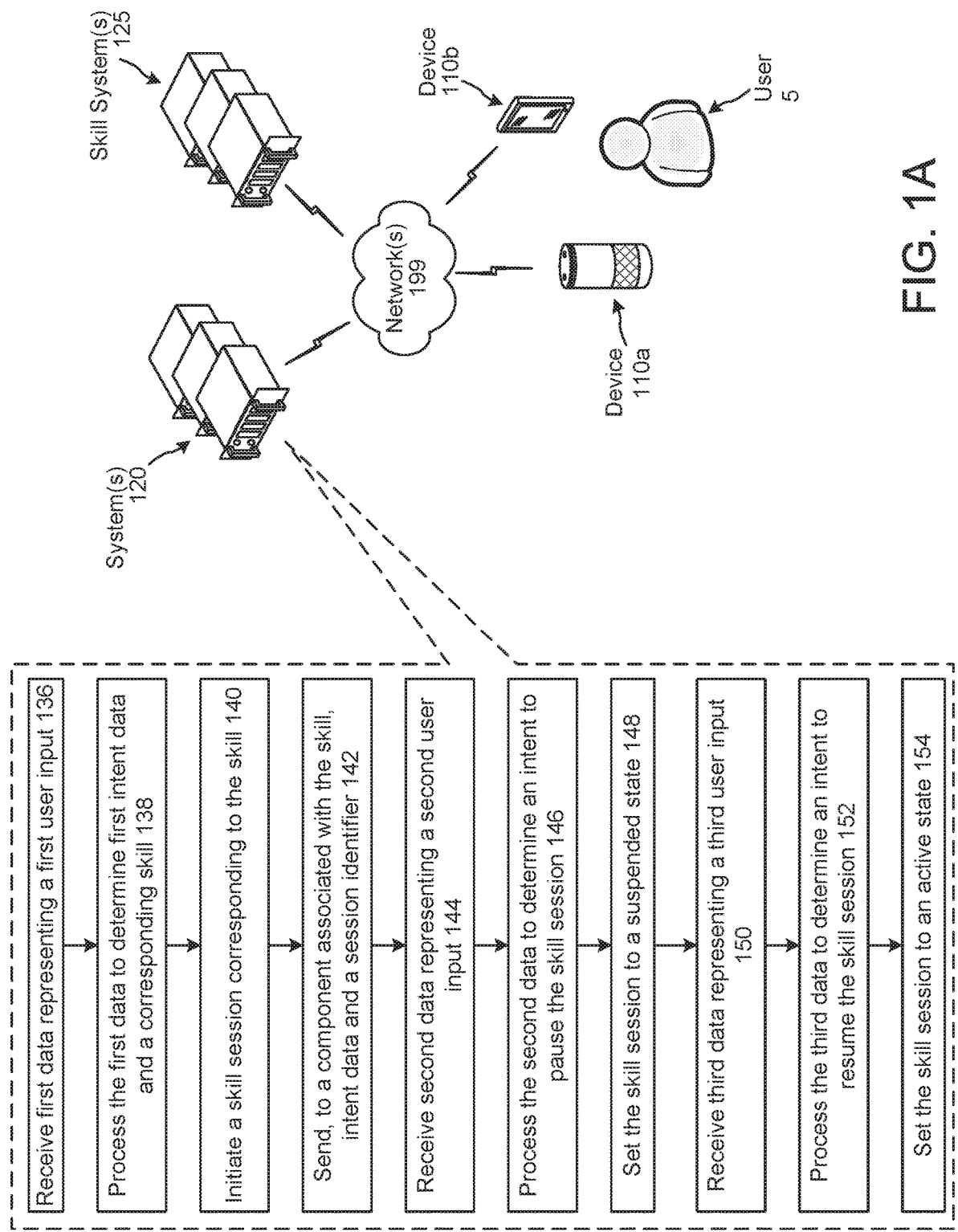
FIG. 1A illustrates a system configured to pause and resume a skill according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

Certain systems may be configured to perform actions responsive to user inputs. For example, for the user input of "Alexa, play Adele music," a system may output music sung by an artist named Adele. For further example, for the user input of "Alexa, what is the weather," a system may output synthesized speech representing weather information for a geographic location of the user. In a further example, for the user input of "Alexa, send a message to John," a system may capture spoken message content and cause same to be output via a device registered to "John."

The system may include multiple applications and/or skills that are capable of performing particular actions. The system may identify an appropriate application and/or skill to perform a particular action. For example, a skill system corresponding to Spotify and a skill system corresponding to Pandora are both capable of playing music. The system may choose one of these skill systems to play music based on various factors.

In a patentable improvement, the system enables a user to pause or interrupt an application or other type of skill and return to it or resume it. In other cases, the system enables users to multitask by allowing a user to initiate another experience (via an application and/or skill) during interactions with an initial application and/or skill, and then return to or resume the previous experience. For example, while interacting with a game skill (e.g., trivia game), the user may say "add milk to my shopping cart" and the system may pause the game skill, invoke a shopping skill, and respond "milk is added to your shopping cart." In some cases, the system may automatically resume the game skill, and in other cases, the system may resume the game skill after receiving a user request (e.g., user says "Alexa, resume the game").

The system described herein enables such multitasking by centralizing management of experience sessions using a session manager component. The session manager component may be configured to track the state of a session, which may include active, suspended or terminated. The session manager component may also be configured to determine when to resume a suspended session. The system may further be configured to determine when user input indicates an intent to interrupt the current experience and invoke another experience.

As used herein, a session (may also be referred to as a skill session) refers to an interaction between the user and the system that invokes an application and/or skill. One session may correspond to invocation of a single application and/or skill. For example, a session may be initiated when an instance of an application and/or skill is invoked and the session may be terminated when the interaction with the application and/or skill is completed (upon user request or automatically by the system). In some cases, invoking another instance of the application and/or skill may initiate another session.

Figure 1B:
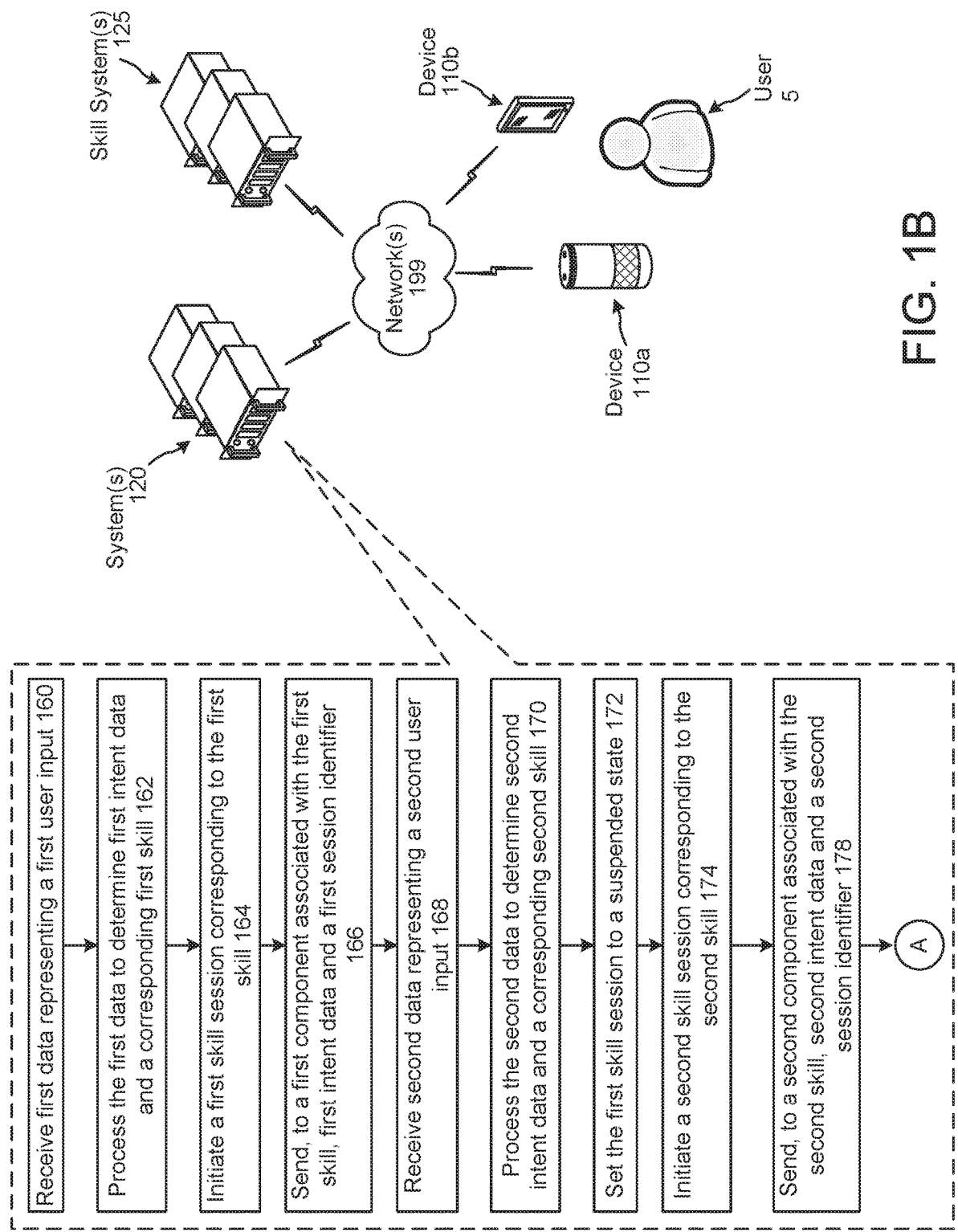
FIGS. 1B and 1C illustrate a system configured to interrupt a skill and invoke another skill according to embodiments of the present disclosure
Figure 1C:
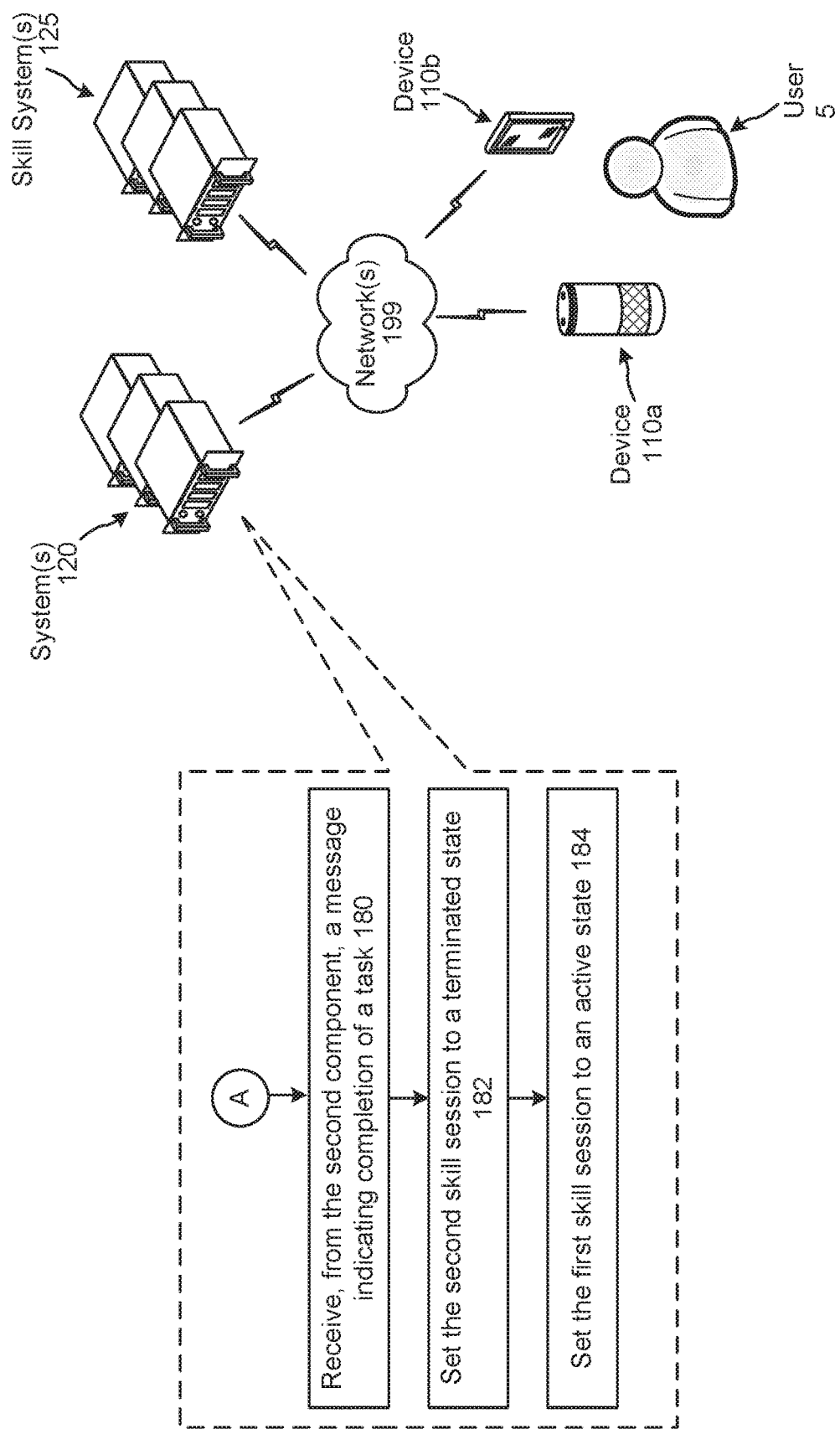

FIG. 1A illustrates a system configured to pause and resume a skill according to embodiments of the present disclosure. FIGS. 1B and 1C illustrates a system configured to interrupt a skill and invoke another skill according to embodiments of the present disclosure. As illustrated in FIGS. 1A, 1B and 1C, the system may include one or more devices (110a/110b) local to a user 5, one or more systems 120, and one or more skill systems 125 connected across one or more networks 199.

Referring to FIG. 1A, the system(s) 120 may receive (136) first data representing a first user input. The first data may be audio data representing an utterance spoken by the user 5 and captured by the device 110a. Alternatively, the first data may be text data inputted by the user 5 via the device 110b. The system(s) 120 may process (138) the first data to determine first intent data and a corresponding skill. For example, in the case where the first data is audio data, the system(s) 120 may perform ASR processing to determine text data and perform NLU using the text data to determine the first intent data. Using the first intent data, the system(s) 120 may determine a skill that corresponds to the intent data and is capable of processing the user request represented in the first data.

The system(s) 120 may initiate (140) a skill session corresponding to the skill. The system(s) 120 may use the skill session to track the beginning and end of the interaction between the user and the skill. The system(s) 120 may generate a data record to store data corresponding to the skill session, including a session identifier, a skill identifier, status/state of the session, and other data relating to the skill session. The system(s) 120 may also set the skill session to active by updating the status/state field of the data record to indicate active. The system(s) 120 may send (142), to a component (e.g., skill system 125) associated with the skill, the first intent data and the session identifier. The first intent data may include a NLU hypothesis, slot data, tokens, and other related data the skill may need to perform an action corresponding to the first user input.

The system(s) 120 may receive additional user inputs that may be provided to the skill for further processing. For example, the user may interact with the skill in a turn-by-turn dialog interaction, where the user provides an input, the system responds with an output, the user provides another input, the system responds with another output, and so on. The system(s) 120 may process the additional user inputs to determine that they correspond to the skill (determined in step 138), and send the user inputs to the skill for further processing along with the session identifier. The system(s) 120 may determine that the additional user inputs correspond to the skill session initiated in step 140 based on the intent data corresponding to the additional user inputs being associated with the skill corresponding to the skill session.

At some time after receiving the first data and/or the additional user inputs, the system(s) 120 may receive (144) second data representing a second user input. The second data may be audio data representing an utterance spoken by the user 5 and captured by the device 110a. Alternatively, the second data may be text data inputted by the user 5 via the device 110b. The system(s) 120 may process (146) the second data to determine that it represents an intent to pause the skill session. For example, the user input may be "pause" or "Alexa, pause", and the system(s) 120 (in the case where the second data is audio data) may perform ASR processing to determine text data and perform NLU using the text data to determine the intent is to pause the skill session.

In response to determining the intent to pause the skill session, the system(s) 120 may set (148) the skill session to a suspended state. The system(s) 120 may do so by updating the status/state field of the data record corresponding to the skill session to indicate suspended. The system(s) 120 may send a message to the device (e.g., skill system 125) associated with the skill to indicate that the skill session is suspended. The device may send a response including resumption data, which may indicate whether the skill is capable of pausing and resuming, a time duration within which the skill can resume, and other data.

The system(s) 120 may receive (150) third data representing a third user input. The third data may be audio data representing an utterance spoken by the user 5 and captured by the device 110a. Alternatively, the third data may be text data inputted by the user 5 via the device 110b. The system(s) 120 may process (152) the third data to determine that it represents an intent to pause the skill session. For example, the user input may be "resume" or "Alexa, resume", and the system(s) 120 (in the case where the third data is audio data) may perform ASR processing to determine text data and perform NLU using the text data to determine the intent is to resume the skill session.

In response to determining the intent to resume the skill session, the system(s) 120 may set (154) the skill session to an active state. The system(s) 120 may do so by updating the status/state field of the data record corresponding to the skill session to indicate active. The system(s) 120 may send a message to the device (e.g., skill system 125) associated with the skill to indicate that the skill session is active.

At a later time when the interaction between the user and the skill has ended, the system(s) 120 may set the skill session to a terminated state. The system(s) 120 may do so by updating the status/state field of the data record corresponding to the skill session to indicate terminated. The system(s) 120 may set the skill session to terminated if the system(s) 120 receives user input indicating an intent to end the skill session. For example, the user input may be "exit" or "Alexa, exit." Alternatively, the system(s) 120 may set the skill session to terminated if the system(s) 120 may determines that the task(s) corresponding to the user inputs has been completed by the skill. For example, the skill (via the skill system 125) may send a message to the system(s) 120 indicating that the task is completed and the corresponding skill session should end.

Referring to FIGS. 1B and 1C, the system(s) 120 may receive (160) first data representing a first user input. The first data may be audio data representing an utterance spoken by the user 5 and captured by the device 110a. Alternatively, the first data may be text data inputted by the user 5 via the device 110b. The system(s) 120 may process (162) the first data to determine first intent data and a corresponding first skill. For example, in the case where the first data is audio data, the system(s) 120 may perform ASR processing to determine text data and perform NLU using the text data to determine the first intent data. Using the first intent data, the system(s) 120 may determine a first skill that corresponds to the first intent data and is capable of processing the user request represented in the first data.

The system(s) 120 may initiate (164) a first skill session corresponding to the first skill. The system(s) 120 may use the first skill session to track the beginning and end of the interaction between the user and the first skill. The system(s) 120 may generate a first data record to store data corresponding to the first skill session, including a first session identifier, a first skill identifier, first status/state of the session, and other data relating to the first skill session. The system(s) 120 may also set the first skill session to active by updating the first status/state field of the first data record to indicate active. The system(s) 120 may send (166), to a first component (e.g., skill system 125) associated with the first skill, the first intent data and the first session identifier. The first intent data may include a NLU hypothesis, slot data, tokens, and other related data the first skill may need to perform an action corresponding to the first user input.

The system(s) 120 may receive additional user inputs that may be provided to the first skill for further processing. For example, the user may interact with the first skill in a turn-by-turn dialog interaction, where the user provides an input, the system responds with an output, the user provides another input, the system responds with another output, and so on. The system(s) 120 may process the additional user inputs to determine that they correspond to the first skill, and send the user inputs to the first skill for further processing along with the first session identifier. The system(s) 120 may determine that the additional user inputs correspond to the first skill session based on the intent data corresponding to the additional user inputs being associated with the first skill.

At some time after receiving the first data and/or the additional user inputs, the system(s) 120 may receive (168) second data representing a second user input. The second data may be audio data representing an utterance spoken by the user 5 and captured by the device 110a. Alternatively, the second data may be text data inputted by the user 5 via the device 110b. The system(s) 120 may process (170) the second data to determine second intent data and a corresponding second skill. For example, the system(s) 120 may perform ASR processing to determine text, in the case where the second data is audio data. During NLU processing, the system(s) 120 may determine that the second user input does not correspond to the first skill, may correspond to the second skill. In other words, the system(s) 120 may determine that the second skill may be required to respond to the second user input.

In response to determining the second intent data corresponds to the second skill, the system(s) 120 may set (172) the first skill session to a suspended state. The system(s) 120 may do so by updating the first status/state field of the data record corresponding to the first skill session to indicate suspended. The system(s) 120 may send a message to the first device (e.g., skill system 125) associated with the first skill to indicate that the first skill session is suspended. The first device may send a response including resumption data, which may indicate whether the first skill is capable of pausing and resuming, a time duration within which the first skill can resume, and other data.

The system(s) 120 may initiate (174) a second skill session corresponding to the second skill to track the beginning and end of the interaction between the user and the second skill. The system(s) 120 may generate a second data record to store data corresponding to the second skill session, including a second session identifier, a second skill identifier, second status/state of the session, and other data relating to the second skill session. The system(s) 120 may also set the second skill session to active by updating the second status/state field of the second data record to indicate active. The system(s) 120 may send (178), to a second component (e.g., skill system 125) associated with the second skill, the second intent data and the second session identifier. The second intent data may include a NLU hypothesis, slot data, tokens, and other related data the second skill may need to perform an action corresponding to the second user input.

The system(s) 120 may receive additional user inputs, after the second user input, that may be routed to the second skill for further processing as the user may interact with the second skill in a turn-by-turn dialog interaction. The system(s) 120 may process the additional user inputs to determine that they correspond to the second skill, and send the user inputs to the second skill for further processing at least in part because the second skill session is active and may also send the second session identifier. The system(s) 120 may determine that the additional user inputs correspond to the second skill session based on the intent data corresponding to the additional user inputs being associated with the second skill.

The system(s) 120 may receive (180), from the second component associated with the second skill, a message indicating completion of a task(s) corresponding to the second user input and/or the additional user inputs. In response, the system(s) 120 may set (182) the second skill session to a terminated state. The system(s) 120 may do so by updating the second status/state field of the second data record corresponding to the second skill session to indicate terminated.

The system(s) 120 may set (184) the first skill session to an active state, enabling the user to resume the previous interaction. The system(s) 120 may do so by updating the first status/state field of the first data record corresponding to the first skill session to indicate active.

In example embodiments, when a skill session is in an active state, the system(s) 120 may route user inputs to the corresponding skill for processing, unless the user input indicates an intent to pause or end the skill session. For example, in a multi-turn interaction with a skill, like a trivia game skill, where the system outputs a question and the user provides an answer, the system(s) 120 route the user inputs/answers to the trivia game skill for processing, until the user input is "pause the game" or "exit the game."

In example embodiments, when a skill session is in a suspended state, the system(s) 120 may not route user inputs to the corresponding skill for processing, unless the user input indicates an intent to resume the skill session. When a skill session is in a terminated state, the system(s) 120 may stop routing user inputs to the corresponding skill. If further user inputs indicate an intent corresponding to that skill, then the system(s) 120 may initiate a new skill session to track the beginning and end of the new interaction.

Although the present disclosure describes pausing a first skill session and resuming the first skill session, it should be understood that resuming the first skill session may include initiating or generating another skill session to resume the activity associated with the first skills session. The system(s) 120 may store data indicating that the new skill session is resuming the activity of the first skill session. The new skill session may begin processing the last state of data corresponding to when the first skill session was suspended.

In some embodiments, the system(s) 120 may determine if the first skill session can be interrupted or placed in a suspended state. For example, the system(s) 120 may receive data from the first skill (e.g., a skill system 125) indicating whether the first skill session can be paused or interrupted. If the data indicates that the first skill session cannot be paused or suspended, then the system(s) 120 may continue processing with the first skill without invoking the second skill. For example, the system(s) 120 may output "sorry the request cannot be processed at this time" or other similar indication to the user. The system(s) 120 may also receive an indication from the first skill representing a capability of resuming the first skill session. If the first skill indicates that the first skill session cannot be resumed, then the system(s) 120 may set the first skill session in a terminated state by associating status data with the first data record indicating that the session is terminated.

In some embodiments, the system(s) 120 may store policy data representing criteria for interrupting a skill session. The policy data may indicate when a skill session can be interrupted, for example, a particular time, after a certain amount time the user has interacted with the skill, during or after a particular step is performed by the skill, and the like. The policy data may also indicate an engagement level of the active skill and the interrupting skill. An engagement level of high may indicate that the user is highly interactive with the skill, where the user may be involved in a turn-by-turn dialog session with the skill. An engagement level of low may indicate that the user is not actively interacting with the skill but rather the skill may be operating in the background, for example, playing/outputting some content (e.g., music, video, etc.). Depending on the engagement level of the skill, the policy data may indicate whether another skill can interrupt the active skill. If the engagement level is high, then another skill may not interrupt the active skill, however, if the engagement level is low, then another skill may interrupt the active skill. Additionally, the policy data may indicate whether a skill can be interrupted based on the engagement level of the interrupting skill. The policy data may also indicate the type of resource (e.g., speakers, display screen, etc.) used by the active skill and the interrupting skill. For example, a skill using the display screen may not be interrupted by another skill that also needs to use the display screen. However, a skill using the display screen may be interrupted by another skill that needs to use the speakers to provide an output.

The overall system of the present disclosure may operate using various components as illustrated in FIG. 2A. The various components may be located on same or different physical devices. Communication between various components may occur directly or across a network(s) 199.

An audio capture component(s), such as a microphone or array of microphones of the device 110a, captures audio 11. The device 110a processes audio data, representing the audio 11, to determine whether speech is detected. The device 110a may use various techniques to determine whether audio data includes speech. In some examples, the device 110a may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110a may implement a limited classifier configured to distinguish speech from background noise. The classifier may be implemented by techniques such as linear classifiers, support vector machines, and decision trees. In still other examples, the device 110a may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110a may use a wakeword detection component 220 to perform wakeword detection to determine when a user intends to speak an input to the device 110. An example wakeword is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110a may "wake" and begin transmitting audio data 211, representing the audio 11, to the system(s) 120. The audio data 211 may include data corresponding to the wakeword, or the device 110a may remove the portion of the audio corresponding to the wakeword prior to sending the audio data 211 to the system(s) 120.

An orchestrator component 230 may receive the audio data 211. The orchestrator component 230 may include memory and logic that enables the orchestrator component 230 to transmit various pieces and forms of data to various components of the system, as well as perform other operations.

The orchestrator component 230 sends the audio data 211 to an ASR component 250. The ASR component 250 transcribes the audio data 211 into text data. The text data output by the ASR component 250 represents one or more than one (e.g., in the form of an n-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 outputs text data representing one or more ASR hypotheses. The text data output by the ASR component 250 may include a top scoring ASR hypothesis or may include an n-best list of ASR hypotheses. Each ASR hypothesis may be associated with a respective score. Each score may indicate a confidence of ASR processing performed to generate the ASR hypothesis with which the score is associated.

The device 110b may receive a text-based user input. The device 110b may generate text data 213 representing the text-based user input. The device 110a may send the text data 213 to the system(s) 120. The orchestrator component 230 may receive the text data 213.

The orchestrator component 230 may send text data (e.g., text data output by the ASR component 250 or the received text data 213) to an NLU component 260.

The NLU component 260 attempts to make a semantic interpretation of the phrase(s) or statement(s) represented in the received text data. That is, the NLU component 260 determines one or more meanings associated with the phrase(s) or statement(s) represented in the text data based on words represented in the text data. The NLU component 260 determines an intent representing an action that a user desires be performed as well as pieces of the text data that allow a device (e.g., the device 110, the system(s) 120, a skill 290, a skill system(s) 125, etc.) to execute the intent. For example, if the text data corresponds to "play Adele music," the NLU component 260 may determine an intent that the system(s) 120 output music and may identify "Adele" as an artist. For further example, if the text data corresponds to "what is the weather," the NLU component 260 may determine an intent that the system(s) 120 output weather information associated with a geographic location of the device 110. In another example, if the text data corresponds to "turn off the lights," the NLU component 260 may determine an intent that the system(s) 120 turn off lights associated with the device(s) 110 or the user(s) 5. The NLU component 260 may send NLU results data (which may include tagged text data, indicators of intent, etc.).

The system(s) 120 may include one or more skills 290. A "skill" may be software running on the system(s) 120 that is akin to a software application running on a traditional computing device. That is, a skill 290 may enable the system(s) 120 to execute specific functionality in order to provide data or produce some other requested output. The system(s) 120 may be configured with more than one skill 290. For example, a weather service skill may enable the system(s) 120 to provide weather information, a car service skill may enable the system(s) 120 to book a trip with respect to a taxi or ride sharing service, a restaurant skill may enable the system(s) 120 to order a pizza with respect to the restaurant's online ordering system, etc. A skill 290 may operate in conjunction between the system(s) 120 and other devices, such as the device 110, in order to complete certain functions. Inputs to a skill 290 may come from speech processing interactions or through other interactions or input sources. A skill 290 may include hardware, software, firmware, or the like that may be dedicated to a particular skill 290 or shared among different skills 290.

In addition or alternatively to being implemented by the system(s) 120, a skill 290 may be implemented by a skill system(s) 125. Such may enable a skill system(s) 125 to execute specific functionality in order to provide data or perform some other action requested by a user.

Skills may be associated with different domains, such as smart home, music, video, flash briefing, shopping, and custom (e.g., skills not associated with any pre-configured domain).

The system(s) 120 may be configured with a single skill 290 dedicated to interacting with more than one skill system 125.

Unless expressly stated otherwise, reference to a skill component may include a skill 290 operated by the system(s) 120 and/or skill operated by the skill system(s) 125. Moreover, the functionality described herein as a skill may be referred to using many different terms, such as an action, bot, app, or the like. A skill component may be software on a user device (e.g., device 110), software on a remote device (e.g., skill system 125), a combination of software on a user device and a remote device, a system including multiple components (e.g., a smart home system), one component of a multi-component system, and the like.

The system(s) 120 may include a post-NLU ranker 265 that receives NLU results data and determines (as described in detail herein) which skill the system(s) 120 should invoke to execute with respect to the user input. The post-NLU ranker 265 may be implemented separately from the orchestrator component 230 (as illustrated) or one or more components of the post-NLU ranker 265 may be implemented as part of the orchestrator component 230.

The system(s) 120 may include a TTS component 280. The TTS component 280 may generate audio data (e.g., synthesized speech) from text data using one or more different methods. Text data input to the TTS component 280 may come from a skill 290, the orchestrator component 230, or another component of the system(s) 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The system(s) 120 may include profile storage 270. The profile storage 270 may include a variety of information related to individual users, groups of users, devices, etc. that interact with the system(s) 120. A "profile" refers to a set of data associated with a user, group of users, device, etc. The data of a profile may include preferences specific to the user, group of users, device, etc.; input and output capabilities of one or more devices; internet connectivity information; user bibliographic information; subscription information; as well as other information.

The profile storage 270 may include one or more user profiles, with each user profile being associated with a different user identifier. Each user profile may include various user identifying information. Each user profile may also include preferences of the user and/or one or more device identifiers, representing one or more devices registered to the user. Each user profile may include identifiers of skills that the user has enabled. When a user enables a skill, the user is providing the system(s) 120 with permission to allow the skill to execute with respect to the user's inputs. If a user does not enable a skill, the system(s) 120 may not permit the skill to execute with respect to the user's inputs.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device profiles representing one or more devices associated with the group profile.

The profile storage 270 may include one or more device profiles. Each device profile may be associated with a different device identifier. Each device profile may include various device identifying information. Each device profile may also include one or more user identifiers, representing one or more user profiles associated with the device profile. For example, a household device's profile may include the user identifiers of users of the household.

Figure 6:
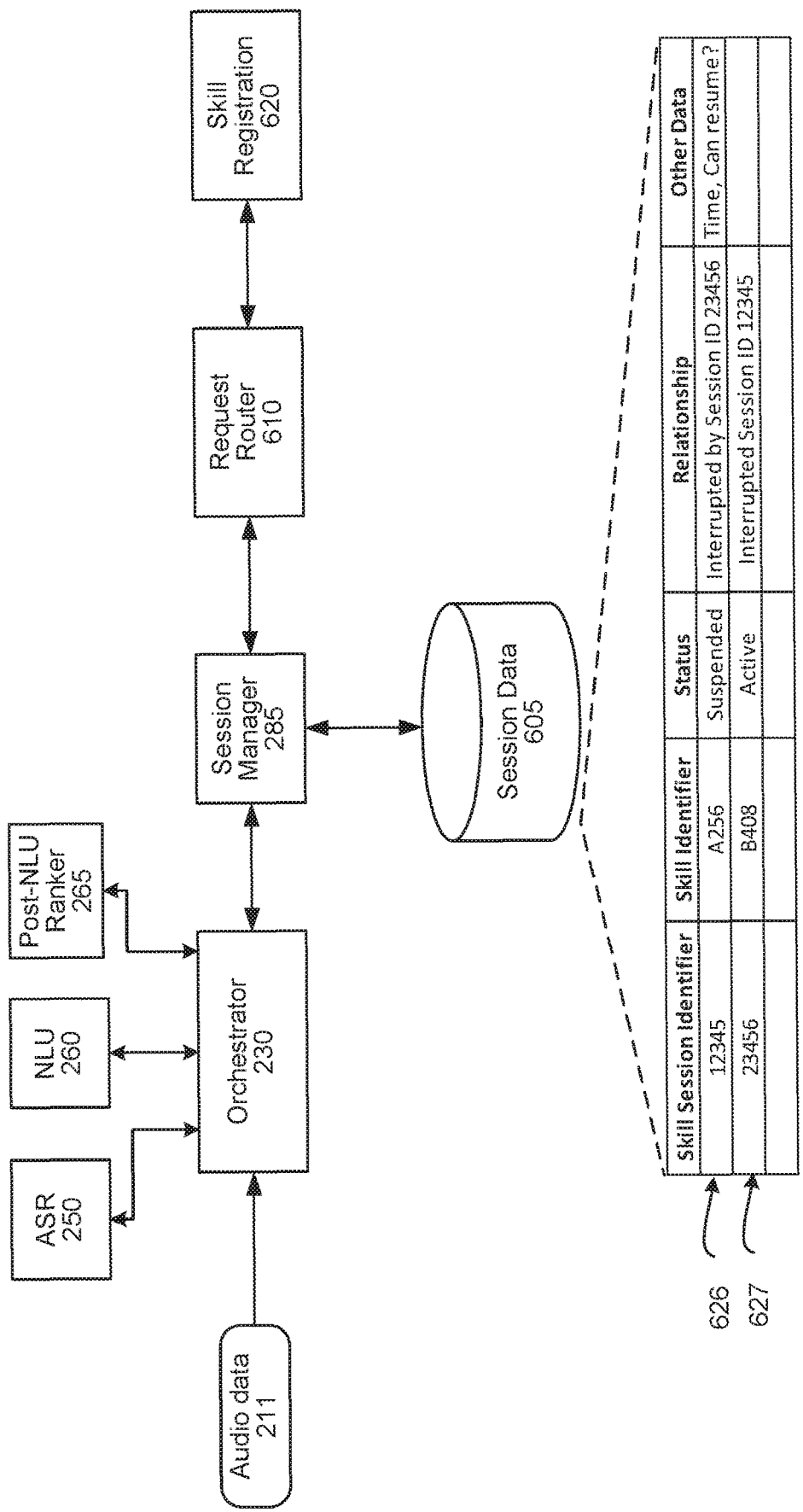
FIG. 6 is a conceptual diagram illustrating additional components that a system may use to process a request to interrupt a skill and invoke another skill according to embodiments of the present disclosure.

The system(s) 120 may include a links action manager component 295, operations of which are described further in connection with FIG. 6. The links action manager component 295 may facilitate determining which skills are registered to perform an action, validate payload data received from a skill to determine whether the action can be performed by another skill, and facilitate other functionalities described herein.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Figure 2B:
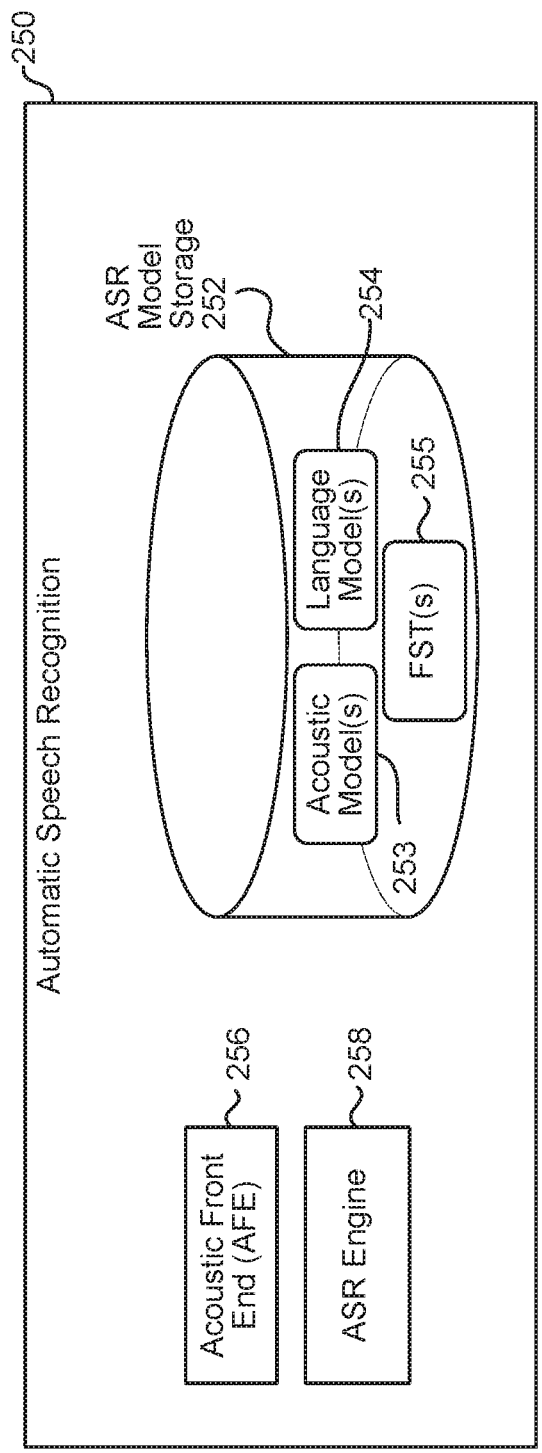
FIG. 2B is a conceptual diagram of automatic speech recognition components of the system according to embodiments of the present disclosure.

FIG. 2B as illustrated shows specific components of the ASR component 250. As noted above, the ASR component 250 transcribes audio data into text data representing the words of the speech contained in the audio data. The text data may then be used by other components for various purposes, such as executing system commands, inputting data, etc. A spoken utterance in the audio data is input to a processor configured to perform ASR which then interprets the utterance based on the similarity between the utterance and pre-established language models 254 stored in an ASR model storage 252. For example, the ASR process may compare the input audio data with models for sounds (e.g., subword units or phonemes) and sequences of sounds to identify words that match the sequence of sounds spoken in the utterance of the audio data. Alternatively, the ASR process may use a finite state transducer (FST) 255 to implement the language model functions, as explained below.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 253 stored in an ASR model storage 252), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, the ASR process 250 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 256 and an ASR engine 258. The acoustic front end (AFE) 256 transforms the audio data from the microphone into data for processing by the n. The ASR engine 258 compares the speech recognition data with acoustic models 253, language models 254, FST 255, and/or other data models and information for recognizing the speech conveyed in the audio data. The AFE 256 may reduce noise in the audio data and divide the digitized audio data into frames representing time intervals for which the AFE determines a number of values, called features, representing the qualities of the audio data, along with a set of those values, called a feature vector, representing the features/qualities of the audio data within the frame. Typically audio frames may be 10 ms each. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The ASR engine 258 may process the output from the AFE 256 with reference to information stored in ASR model storage (252). Alternatively, post front-end processed data (such as feature vectors) may be received by the device executing ASR processing from another source besides the internal AFE. For example, the device 110 may process audio data into feature vectors (for example using an on-device AFE 256) and transmit that information to a server across a network 199 for ASR processing. Feature vectors may arrive at the server encoded, in which case they may be decoded prior to processing by the processor executing the ASR engine 258.

The ASR engine 258 attempts to match received feature vectors to language phonemes and words as known in the stored acoustic models 253, language models 254, and FST 255. The ASR engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc.

The ASR engine 258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using finite state transducers (FSTs) explained below, may also be used.

As part of the ASR processing the ASR engine 258 may use acoustic model(s) 253 to attempt to match received audio feature vectors to words or subword units. A subword unit may be a senon, phoneme, phoneme in context, syllable, part of a syllable, syllable in context, or any other such portion of a word. The ASR engine 258 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR module outputs speech results that make sense grammatically.

The ASR engine 258 may use a number of techniques to match feature vectors to phonemes or other phonetic units, such as biphones, triphones, etc. One common technique is using Hidden Markov Models (HMMs). HMMs are used to determine probabilities that feature vectors may match phonemes. Using HMMs, a number of states are presented, in which the states together represent a potential phoneme (or other speech unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the MINI and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the ASR engine 258, the state may change or stay the same, based on the processing of the new feature vectors. A Viterbi algorithm may be used to find the most likely sequence of states based on the processed feature vectors.

In one example, the ASR engine 258 may receive a series of feature vectors for sound corresponding to a user saying "There is a bat in my car." The ASR engine 258 may attempt to match each feature vector with a phoneme. As new feature vectors are processed, the ASR engine 258 may determine state transitions (for example, using HMMs) to determine whether a probability of whether a state should either remain the same, or change to a new state, i.e., whether an incoming feature vector results in a state transition from one phone to another. As the processing continues, the ASR engine 258 continues calculating such state transition probabilities. After processing one feature vector, the speech recognition may move to the next feature vector.

Probabilities and states may be calculated using a number of techniques. For example, probabilities for each state may be calculated using a Gaussian model, Gaussian mixture model, or other technique based on the feature vectors. Techniques such as maximum likelihood estimation (MLE) may be used to estimate the probability of phoneme states.

In addition to calculating potential states for one phoneme as a potential match to a feature vector, the ASR engine 258 may also calculate potential states for other phonemes. In this manner multiple states and state transition probabilities may be calculated.

The probable states and probable state transitions calculated by the ASR engine 258 are formed into paths. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. When combining scores as part of the ASR processing, scores may be multiplied together (or combined in other ways) to reach a desired combined score or probabilities may be converted to the log domain and added to assist processing.

The ASR engine 258 may also compute scores of branches of the paths based on language models or grammars. Language modeling involves determining scores for what words are likely to be used together to form coherent words and sentences. Application of a language model may improve the likelihood that the ASR module 250 correctly interprets the speech contained in the audio data. For example, acoustic model processing returning the potential phoneme paths of "B A T", "B A D", and "B E D" may be adjusted by a language model to adjust the recognition scores of "B A T" (interpreted as the word "bat"), "B A D" (interpreted as the word "bad"), and "B E D" (interpreted as the word "bed") based on the language context of each word within the spoken utterance. The language modeling may be determined from a text corpus and may be customized for particular applications.

As the ASR engine 258 determines potential words from the input audio the lattice may become very large as many potential sounds and words are considered as potential matches for the input audio. The potential matches may be illustrated as a word result network representing possible sequences of words that may be recognized and the likelihood of each sequence. A word result network may consist of sequences of words that may be recognized and the likelihood of each sequence. The likelihood of any path in the word result network may be determined by an acoustic model and a language model.

The ASR engine 258 may return an N-best list of paths along with their respective recognition scores, corresponding to the top N paths as determined by the ASR engine 258. An application (such as a program or component either internal or external to the ASR component 250) that receives the N-best list may then perform further operations or analysis on the list given the list and the associated recognition scores. For example, the N-best list may be used in correcting errors and training various options and processing conditions of the ASR module 250. The ASR engine 258 may compare the actual correct utterance with the best result and with other results on the N-best list to determine why incorrect recognitions received certain recognition scores. The ASR engine 258 may correct its approach (and may update information in the ASR models 252) to reduce the recognition scores of incorrect approaches in future processing attempts.

Various machine learning techniques may be used to train and operate models to perform various steps described herein, such as user recognition feature extraction, encoding, user recognition scoring, user recognition confidence determination, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

The system(s) 120 may also include a session manager component 285. The session manager component 285 may be configured to schedule the execution of requests and tracking the progress of the corresponding session. The session manager component 285 may consist of persistent storage for all sessions, their state, the relationship between sessions and the users, devices, and other resources associated with each session.

Traditionally, a user can have a multi-turn interaction with a skill without having to use an invocation phrase, like "Alexa", for each turn. To eliminate the need for an invocation phrase in multi-turn conversation, the NLU component 260 may enter a 'sandbox' mode where all utterances are interpreted using the particular skill's interaction model. As a result, user utterances cannot be routed to other skills without exiting the sandbox mode. A skill session enables such sandboxing, and represents the period of time when a skill has the full attention of the user. A skill session may be created by the system(s) 120 when a skill is selected to receive a customer intent (e.g., a LaunchRequest or an IntentRequest). As a part of these requests, the system(s) 120 creates a unique session identifier (ID) and informs skills about the new session being created and the associated session ID. A skill session ends when the user says "Alexa, exit" or when the skill voluntarily ends it by setting a "shouldEndSession" flag in a response to the system(s) 120 as true.

The skill session also enables the following additional concepts: 1) the lifecycle of a specific instance of a user's interaction with a skill; 2) coupling between the session lifecycle and the expectation of an input from the user (for example, setting "shouldEndSession" flag to false will automatically open the device's 110 microphone); and 3) a storage entity for runtime data for a skill (e.g., session attributes). In a patentable improvement and to enable a user to multitask, the system(s) 120 described herein effectively decouple the sandbox mode from the session lifecycle so that the system(s) 120 is able to route user input that intends to interrupt a present skill and invoke another skill.

Figure 3:
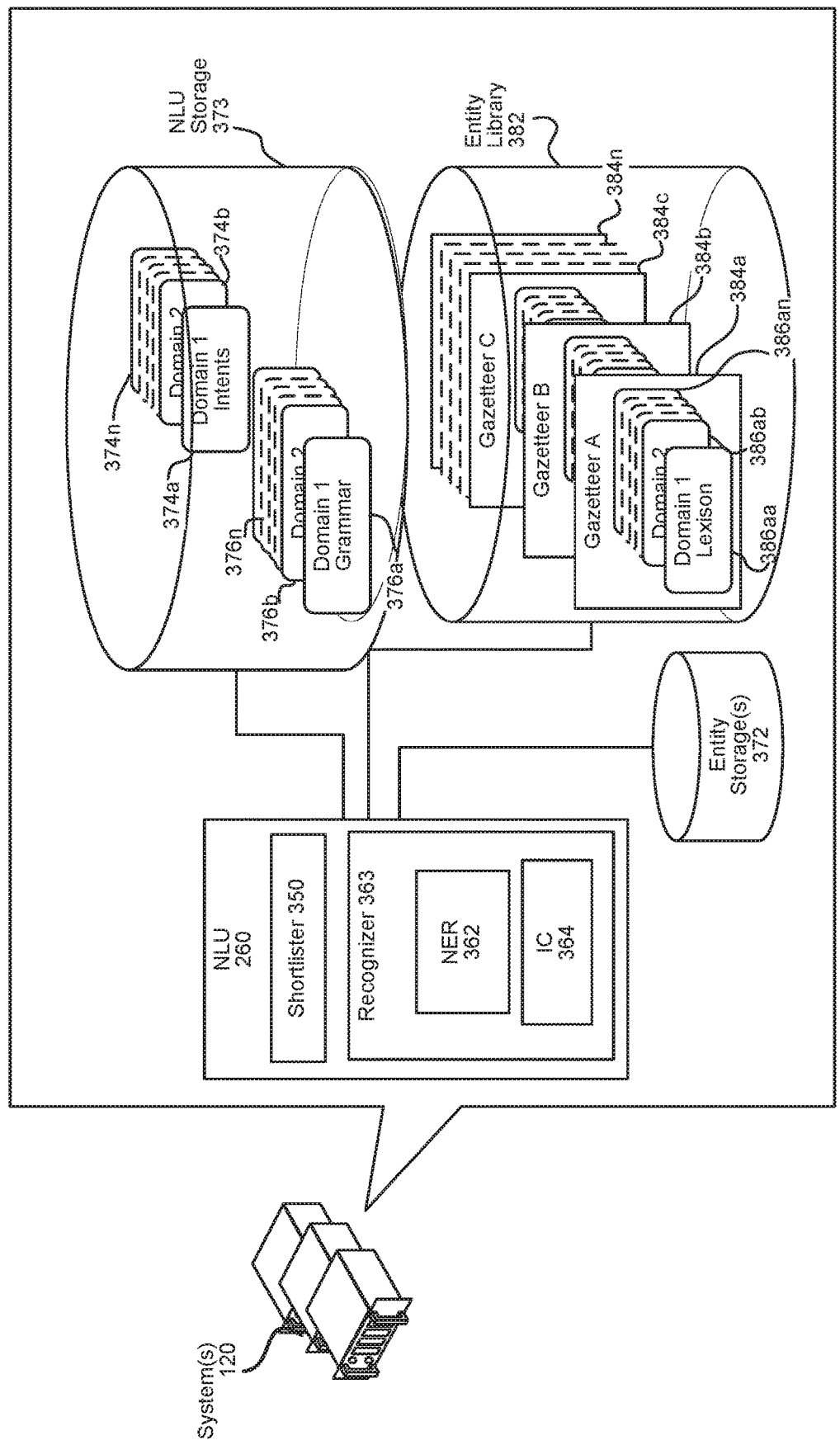
FIG. 3 is a conceptual diagram illustrating how NLU processing may be performed according to embodiments of the present disclosure.

FIG. 3 illustrates how NLU processing is performed on text data. The NLU component 260 may process text data including several ASR hypotheses of a single user input. For example, if the ASR component 250 outputs text data including an n-best list of ASR hypotheses, the NLU component 260 may process the text data with respect to all (or a portion of) the ASR hypotheses represented therein.

The NLU component 260 may annotate text data by parsing and/or tagging the text data. For example, for the text data "tell me the weather for Seattle," the NLU component 260 may tag "tell me the weather for Seattle" as an <OutputWeather> intent as well as separately tag "Seattle" as a location for the weather information.

The NLU component 260 may include a shortlister component 350. The shortlister component 350 selects skills that may execute with respect to text data 410 input to the NLU component 260 (e.g., applications that may execute with respect to the user input). The shortlister component 350 thus limits downstream, more resource intensive NLU processes to being performed with respect to skills that may execute with respect to the user input.

Without a shortlister component 350, the NLU component 260 may process text data 410 input thereto with respect to every skill of the system, either in parallel, in series, or using some combination thereof. By implementing a shortlister component 350, the NLU component 260 may process text data 410 with respect to only the skills that may execute with respect to the user input. This reduces total compute power and latency attributed to NLU processing.

The shortlister component 350 may include one or more trained models. The model(s) may be trained to recognize various forms of user inputs that may be received by the system(s) 120. For example, during a training period skill system(s) 125 associated with a skill may provide the system(s) 120 with training text data representing sample user inputs that may be provided by a user to invoke the skill. For example, for a ride sharing skill, a skill system(s) 125 associated with the ride sharing skill may provide the system(s) 120 with training text data including text corresponding to "get me a cab to [location]," "get me a ride to [location]," "book me a cab to [location]," "book me a ride to [location]," etc. The one or more trained models that will be used by the shortlister component 350 may be trained, using the training text data representing sample user inputs, to determine other potentially related user input structures that users may try to use to invoke the particular skill. During training, the system(s) 120 may solicit the skill system(s) 125 associated with the skill regarding whether the determined other user input structures are permissible, from the perspective of the skill system(s) 125, to be used to invoke the skill. The alternate user input structures may be derived by one or more trained models during model training and/or may be based on user input structures provided by different skills. The skill system(s) 125 associated with a particular skill may also provide the system(s) 120 with training text data indicating grammar and annotations. The system(s) 120 may use the training text data representing the sample user inputs, the determined related user input(s), the grammar, and the annotations to train a model(s) that indicates when a user input is likely to be directed to/handled by a skill, based at least in part on the structure of the user input. Each trained model of the shortlister component 350 may be trained with respect to a different skill. Alternatively, the shortlister component 350 may use one trained model per domain, such as one trained model for skills associated with a weather domain, one trained model for skills associated with a ride sharing domain, etc.

The system(s) 120 may use the sample user inputs provided by a skill system(s) 125, and related sample user inputs potentially determined during training, as binary examples to train a model associated with a skill associated with the skill system(s) 125. The model associated with the particular skill may then be operated at runtime by the shortlister component 350. For example, some sample user inputs may be positive examples (e.g., user inputs that may be used to invoke the skill). Other sample user inputs may be negative examples (e.g., user inputs that may not be used to invoke the skill).

As described above, the shortlister component 350 may include a different trained model for each skill of the system, a different trained model for each domain, or some other combination of trained model(s). For example, the shortlister component 350 may alternatively include a single model. The single model may include a portion trained with respect to characteristics (e.g., semantic characteristics) shared by all skills of the system. The single model may also include skill-specific portions, with each skill-specific portion being trained with respect to a specific skill of the system. Implementing a single model with skill-specific portions may result in less latency than implementing a different trained model for each skill because the single model with skill-specific portions limits the number of characteristics processed on a per skill level.

The portion trained with respect to characteristics shared by more than one skill may be clustered based on domain. For example, a first portion of the portion trained with respect to multiple skills may be trained with respect to weather domain skills, a second portion of the portion trained with respect to multiple skills may be trained with respect to music domain skills, a third portion of the portion trained with respect to multiple skills may be trained with respect to travel domain skills, etc.

Clustering may not be beneficial in every instance because it may cause the shortlister component 350 to output indications of only a portion of the skills that the text data 410 may relate to. For example, a user input may correspond to "tell me about Tom Collins." If the model is clustered based on domain, the shortlister component 350 may determine the user input corresponds to a recipe skill (e.g., a drink recipe) even though the user input may also correspond to an information skill (e.g., including information about a person named Tom Collins).

Training the shortlister component 350 may require establishing a "ground truth" for the training examples input therein. The shortlister component 350 may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

The NLU component 260 may include one or more recognizers 363. Each recognizer 363 may be associated with a different domain (e.g., smart home, video, music, weather, custom, etc.).

If the shortlister component 350 determines text data 410 is potentially associated with multiple domains, the recognizers 363 associated with the domains may process the text data 410, while recognizers 363 not indicated in the shortlister component 350's output may not process the text data 410. The "shortlisted" recognizers 363 may process the text data 410 in parallel, in series, partially in parallel, etc. For example, if text data 410 potentially relates to both a communications domain and a music domain, a recognizer associated with the communications domain may process the text data 410 in parallel, or partially in parallel, with a recognizer associated with the music domain processing the text data 410.

Each recognizer 363 may include a named entity recognition (NER) component 362. The NER component 362 attempts to identify grammars and lexical information that may be used to construe meaning with respect to text data input therein. The NER component 362 identifies portions of text data that correspond to a named entity associated with a domain, associated with the recognizer 363 implementing the NER component 362. The NER component 362 (or other component of the NLU component 260) may also determine whether a word refers to an entity whose identity is not explicitly mentioned in the text data, for example "him," "her," "it" or other anaphora, exophora, or the like.

Each recognizer 363, and more specifically each NER component 362, may be associated with a particular grammar database 376, a particular set of intents/actions 374, and a particular personalized lexicon 386. Each gazetteer 384 may include domain-indexed lexical information associated with a particular user and/or device 110. For example, a Gazetteer A (384a) includes domain-indexed lexical information 386aa to 386an. A user's music domain lexical information might include album titles, artist names, and song names, for example, whereas a user's communications domain lexical information might include the names of contacts. Since every user's music collection and contact list is presumably different. This personalized information improves later performed entity resolution.

An NER component 362 applies grammar information 376 and lexical information 386 associated with a domain (associated with the recognizer 363 implementing the NER component 362) to determine a mention of one or more entities in text data. In this manner, the NER component 362 identifies "slots" (each corresponding to one or more particular words in text data) that may be useful for later processing. The NER component 362 may also label each slot with a type (e.g., noun, place, city, artist name, song name, etc.).

Each grammar database 376 includes the names of entities (i.e., nouns) commonly found in speech about the particular domain to which the grammar database 376 relates, whereas the lexical information 386 is personalized to the user and/or the device 110 from which the user input originated. For example, a grammar database 376 associated with a shopping domain may include a database of words commonly used when people discuss shopping.

A downstream process called entity resolution (discussed in detail elsewhere herein) links a slot of text data to a specific entity known to the system. To perform entity resolution, the NLU component 260 may utilize gazetteer information (384a-384n) stored in an entity library storage 382. The gazetteer information 384 may be used to match text data (representing a portion of the user input) with text data representing known entities, such as song titles, contact names, etc. Gazetteers 384 may be linked to users (e.g., a particular gazetteer may be associated with a specific user's music collection), may be linked to certain domains (e.g., a shopping domain, a music domain, a video domain, etc.), or may be organized in a variety of other ways.

Each recognizer 363 may also include an intent classification (IC) component 364. An IC component 364 parses text data to determine an intent(s) (associated with the domain associated with the recognizer 363 implementing the IC component 364) that potentially represents the user input. An intent represents to an action a user desires be performed. An IC component 364 may communicate with a database 374 of words linked to intents. For example, a music intent database may link words and phrases such as "quiet," "volume off," and "mute" to a <Mute> intent. An IC component 364 identifies potential intents by comparing words and phrases in text data (representing at least a portion of the user input) to the words and phrases in an intents database 374 (associated with the domain that is associated with the recognizer 363 implementing the IC component 364).

The intents identifiable by a specific IC component 364 are linked to domain-specific (i.e., the domain associated with the recognizer 363 implementing the IC component 364) grammar frameworks 376 with "slots" to be filled. Each slot of a grammar framework 376 corresponds to a portion of text data that the system believes corresponds to an entity. For example, a grammar framework 376 corresponding to a <PlayMusic> intent may correspond to text data sentence structures such as "Play {Artist Name}," "Play {Album Name}," "Play {Song name}," "Play {Song name} by {Artist Name}," etc. However, to make entity resolution more flexible, grammar frameworks 376 may not be structured as sentences, but rather based on associating slots with grammatical tags.

For example, an NER component 362 may parse text data to identify words as subject, object, verb, preposition, etc. based on grammar rules and/or models prior to recognizing named entities in the text data. An IC component 364 (implemented by the same recognizer 363 as the NER component 362) may use the identified verb to identify an intent. The NER component 362 may then determine a grammar model 276 associated with the identified intent. For example, a grammar model 376 for an intent corresponding to <PlayMusic> may specify a list of slots applicable to play the identified "object" and any object modifier (e.g., a prepositional phrase), such as {Artist Name}, {Album Name}, {Song name}, etc. The NER component 362 may then search corresponding fields in a lexicon 386 (associated with the domain associated with the recognizer 363 implementing the NER component 362), attempting to match words and phrases in text data the NER component 362 previously tagged as a grammatical object or object modifier with those identified in the lexicon 386.

An NER component 362 may perform semantic tagging, which is the labeling of a word or combination of words according to their type/semantic meaning. An NER component 362 may parse text data using heuristic grammar rules, or a model may be constructed using techniques such as Hidden Markov Models, maximum entropy models, log linear models, conditional random fields (CRF), and the like. For example, an NER component 362 implemented by a music domain recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 362 identifies "Play" as a verb based on a word database associated with the music domain, which an IC component 364 (also implemented by the music domain recognizer) may determine corresponds to a <PlayMusic> intent. At this stage, no determination has been made as to the meaning of "mother's little helper" or "the rolling stones," but based on grammar rules and models, the NER component 362 has determined the text of these phrases relates to the grammatical object (i.e., entity) of the user input represented in the text data.

An NER component 362 may tag text data to attribute meaning thereto. For example, an NER component 362 may tag "play mother's little helper by the rolling stones" as: {domain} Music, {intent}<PlayMusic>, {artist name} rolling stones, {media type} SONG, and {song title} mother's little helper. For further example, the NER component 362 may tag "play songs by the rolling stones" as: {domain} Music, {intent}<PlayMusic>, {artist name} rolling stones, and {media type} SONG.

Figure 4:
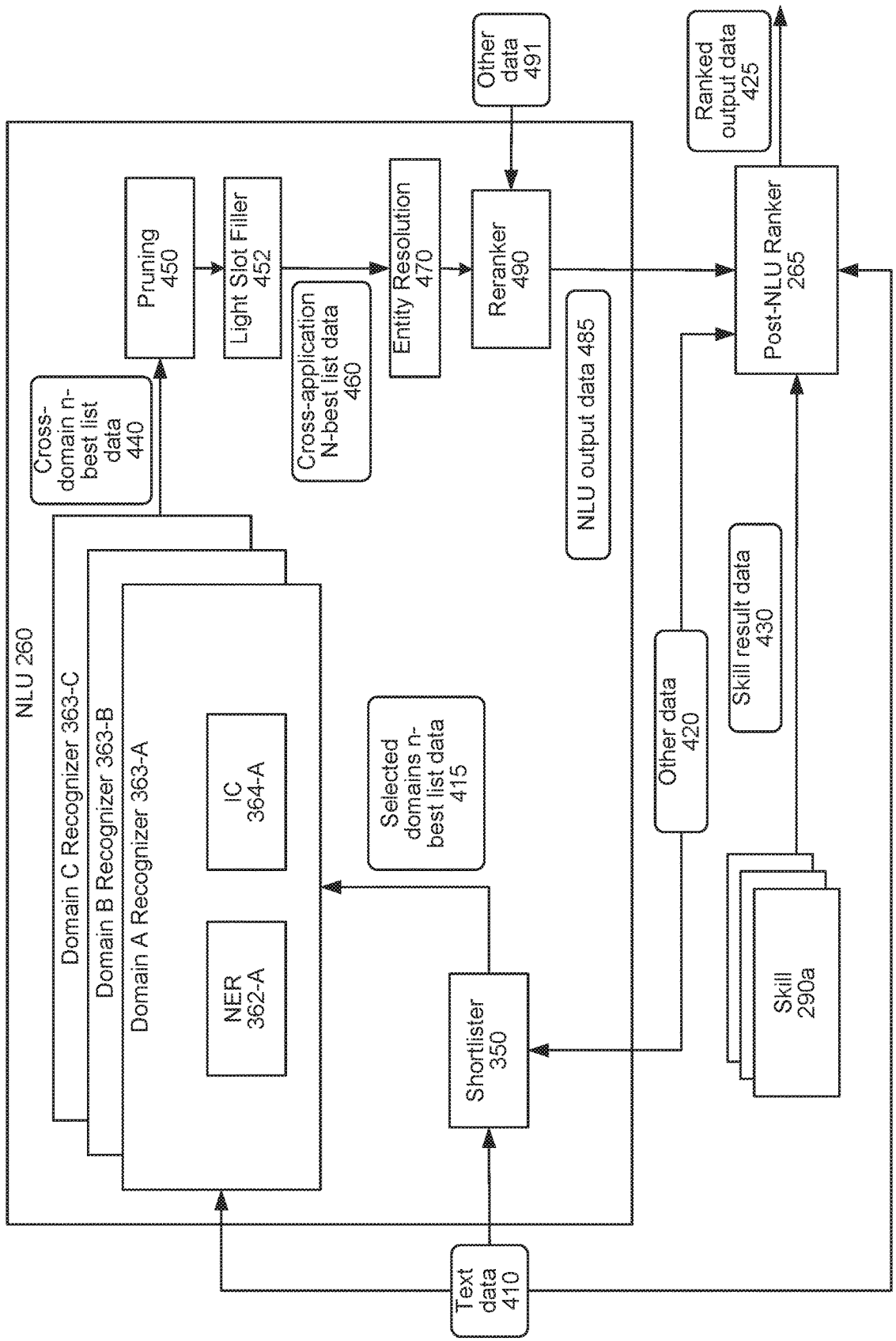
FIG. 4 is a conceptual diagram illustrating how NLU processing may be performed according to embodiments of the present disclosure.

The shortlister component 350 may receive text data 410 output from the ASR component 250 or output from the device 110b (as illustrated in FIG. 4). The ASR component 250 may embed the text data 410 into a form processable by a trained model(s) using sentence embedding techniques as known in the art. Sentence embedding results in the text data 410 including text in a structure that enables the trained models of the shortlister component 450 to operate on the text data 410. For example, an embedding of the text data 410 may be a vector representation of the text data 410.

The shortlister component 350 may make binary determinations (e.g., yes or no) regarding which domains relate to the text data 410. The shortlister component 350 may make such determinations using the one or more trained models described herein above. If the shortlister component 350 implements a single trained model for each domain, the shortlister component 350 may simply run the models that are associated with enabled domains as indicated in a user profile associated with the device 110 and/or user that originated the user input.

The shortlister component 350 may generate n-best list data 415 representing domains that may execute with respect to the user input represented in the text data 410. The size of the n-best list represented in the n-best list data 415 is configurable. In an example, the n-best list data 415 may indicate every domain of the system as well as contain an indication, for each domain, regarding whether the domain is likely capable to execute the user input represented in the text data 410. In another example, instead of indicating every domain of the system, the n-best list data 415 may only indicate the domains that are likely to be able to execute the user input represented in the text data 410. In yet another example, the shortlister component 350 may implement thresholding such that the n-best list data 415 may indicate no more than a maximum number of domains that may execute the user input represented in the text data 410. In an example, the threshold number of domains that may be represented in the n-best list data 415 is ten. In another example, the domains included in the n-best list data 415 may be limited by a threshold a score, where only domains indicating a likelihood to handle the user input is above a certain score (as determined by processing the text data 410 by the shortlister component 350 relative to such domains) are included in the n-best list data 415.

The text data 410 may correspond to more than one ASR hypothesis. When this occurs, the shortlister component 350 may output a different n-best list (represented in the n-best list data 415) for each ASR hypothesis. Alternatively, the shortlister component 350 may output a single n-best list representing the domains that are related to the multiple ASR hypotheses represented in the text data 410.

As indicated above, the shortlister component 350 may implement thresholding such that an n-best list output therefrom may include no more than a threshold number of entries. If the text data 410 includes more than one ASR hypothesis, the n-best list output by the shortlister component 350 may include no more than a threshold number of entries irrespective of the number of ASR hypotheses output by the ASR component 250. Alternatively or in addition, the n-best list output by the shortlister component 350 may include no more than a threshold number of entries for each ASR hypothesis (e.g., no more than five entries for a first ASR hypothesis, no more than five entries for a second ASR hypothesis, etc.).

In addition to making a binary determination regarding whether a domain potentially relates to the text data 410, the shortlister component 350 may generate confidence scores representing likelihoods that domains relate to the text data 410. If the shortlister component 350 implements a different trained model for each domain, the shortlister component 350 may generate a different confidence score for each individual domain trained model that is run. If the shortlister component 350 runs the models of every domain when text data 410 is received, the shortlister component 350 may generate a different confidence score for each domain of the system. If the shortlister component 350 runs the models of only the domains that are associated with skills indicated as enabled in a user profile associated with the device 110 and/or user that originated the user input, the shortlister component 350 may only generate a different confidence score for each domain associated with at least one enabled skill. If the shortlister component 350 implements a single trained model with domain specifically trained portions, the shortlister component 350 may generate a different confidence score for each domain who's specifically trained portion is run. The shortlister component 350 may perform matrix vector modification to obtain confidence scores for all domains of the system in a single instance of processing of the text data 410.

N-best list data 415 including confidence scores that may be output by the shortlister component 350 may be represented as, for example:
  Search domain, 0.67
  Recipe domain, 0.62
  Information domain, 0.57
  Shopping domain, 0.42

As indicated, the confidence scores output by the shortlister component 350 may be numeric values. The confidence scores output by the shortlister component 350 may alternatively be binned values (e.g., high, medium, low).

The n-best list may only include entries for domains having a confidence score satisfying (e.g., equaling or exceeding) a minimum threshold confidence score. Alternatively, the shortlister component 350 may include entries for all domains associated with user enabled skills, even if one or more of the domains are associated with confidence scores that do not satisfy the minimum threshold confidence score.

The shortlister component 350 may consider other data 420 when determining which domains may relate to the user input represented in the text data 410 as well as respective confidence scores. The other data 420 may include usage history data associated with the device 110 and/or user that originated the user input. For example, a confidence score of a domain may be increased if user inputs originated by the device 110 and/or user routinely invoke the domain. Conversely, a confidence score of a domain may be decreased if user inputs originated by the device 110 and/or user rarely invoke the domain. Thus, the other data 420 may include an indicator of the user associated with the text data 410, for example as determined by the user recognition component 295.

The other data 420 may be character embedded prior to being input to the shortlister component 350. The other data 420 may alternatively be embedded using other techniques known in the art prior to being input to the shortlister component 350.

The other data 420 may also include data indicating the domains associated with skills that are enabled with respect to the device 110 and/or user that originated the user input. The shortlister component 350 may use such data to determine which domain-specific trained models to run. That is, the shortlister component 350 may determine to only run the trained models associated with domains that are associated with user-enabled skills. The shortlister component 350 may alternatively use such data to alter confidence scores of domains.

As an example, considering two domains, a first domain associated with at least one enabled skill and a second domain not associated with any user-enabled skills of the user that originated the user input, the shortlister component 350 may run a first model specific to the first domain as well as a second model specific to the second domain. Alternatively, the shortlister component 350 may run a model configured to determine a score for each of the first and second domains. The shortlister component 350 may determine a same confidence score for each of the first and second domains in the first instance. The shortlister component 350 may then alter those confidence scores based on which domains is associated with at least one skill enabled by the present user. For example, the shortlister component 350 may increase the confidence score associated with the domain associated with at least one enabled skill while leaving the confidence score associated with the other domain the same. Alternatively, the shortlister component 350 may leave the confidence score associated with the domain associated with at least one enabled skill the same while decreasing the confidence score associated with the other domain. Moreover, the shortlister component 350 may increase the confidence score associated with the domain associated with at least one enabled skill as well as decrease the confidence score associated with the other domain.

As indicated, a user profile may indicate which skills a corresponding user has enabled (e.g., authorized to execute using data associated with the user). Such indications may be stored in the profile storage 270. When the shortlister component 350 receives the text data 410, the shortlister component 350 may determine whether profile data associated with the user and/or device 110 that originated the command includes an indication of enabled skills.

The other data 420 may also include data indicating the type of the device 110. The type of a device may indicate the output capabilities of the device. For example, a type of device may correspond to a device with a visual display, a headless (e.g., displayless) device, whether a device is mobile or stationary, whether a device includes audio playback capabilities, whether a device includes a camera, other device hardware configurations, etc. The shortlister component 350 may use such data to determine which domain-specific trained models to run. For example, if the device 110 corresponds to a displayless type device, the shortlister component 350 may determine not to run trained models specific to domains that output video data. The shortlister component 350 may alternatively use such data to alter confidence scores of domains.

As an example, considering two domains, one that outputs audio data and another that outputs video data, the shortlister component 350 may run a first model specific to the domain that generates audio data as well as a second model specific to the domain that generates video data. Alternatively the shortlister component 350 may run a model configured to determine a score for each domain. The shortlister component 350 may determine a same confidence score for each of the domains in the first instance. The shortlister component 350 may then alter the original confidence scores based on the type of the device 110 that originated the user input corresponding to the text data 410. For example, if the device 110 is a displayless device, the shortlister component 350 may increase the confidence score associated with the domain that generates audio data while leaving the confidence score associated with the domain that generates video data the same. Alternatively, if the device 110 is a displayless device, the shortlister component 350 may leave the confidence score associated with the domain that generates audio data the same while decreasing the confidence score associated with the domain that generates video data. Moreover, if the device 110 is a displayless device, the shortlister component 350 may increase the confidence score associated with the domain that generates audio data as well as decrease the confidence score associated with the domain that generates video data.

The type of device information represented in the other data 420 may represent output capabilities of the device to be used to output content to the user, which may not necessarily be the user input originating device. For example, a user may input a spoken user input corresponding to "play Game of Thrones" to a device not including a display. The system may determine a smart TV or other display device (associated with the same user profile) for outputting Game of Thrones. Thus, the other data 420 may represent the smart TV of other display device, and not the displayless device that captured the spoken user input.

The other data 420 may also include data indicating the user input originating device's speed, location, or other mobility information. For example, the device may correspond to a vehicle including a display. If the vehicle is moving, the shortlister component 350 may decrease the confidence score associated with a domain that generates video data as it may be undesirable to output video content to a user while the user is driving. The device may output data to the system(s) 120 indicating when the device is moving.

The other data 420 may also include data indicating a currently invoked domain. For example, a user may speak a first (e.g., a previous) user input causing the system to invoke a music domain skill to output music to the user. As the system is outputting music to the user, the system may receive a second (e.g., the current) user input. The shortlister component 350 may use such data to alter confidence scores of domains. For example, the shortlister component 350 may run a first model specific to a first domain as well as a second model specific to a second domain. Alternatively, the shortlister component 350 may run a model configured to determine a score for each domain. The shortlister component 350 may also determine a same confidence score for each of the domains in the first instance. The shortlister component 350 may then alter the original confidence scores based on the first domain being invoked to cause the system to output content while the current user input was received. Based on the first domain being invoked, the shortlister component 350 may (i) increase the confidence score associated with the first domain while leaving the confidence score associated with the second domain the same, (ii) leave the confidence score associated with the first domain the same while decreasing the confidence score associated with the second domain, or (iii) increase the confidence score associated with the first domain as well as decrease the confidence score associated with the second domain.

The thresholding implemented with respect to the n-best list data 415 generated by the shortlister component 350 as well as the different types of other data 420 considered by the shortlister component 350 are configurable. For example, the shortlister component 350 may update confidence scores as more other data 420 is considered. For further example, the n-best list data 415 may exclude relevant domains if thresholding is implemented. Thus, for example, the shortlister component 350 may include an indication of a domain in the n-best list 415 unless the shortlister component 350 is one hundred percent confident that the domain may not execute the user input represented in the text data 410 (e.g., the shortlister component 350 determines a confidence score of zero for the domain).

The shortlister component 350 may send the text data 410 to recognizers 363 associated with domains represented in the n-best list data 415. Alternatively, the shortlister component 350 may send the n-best list data 415 or some other indicator of the selected subset of domains to another component (such as the orchestrator component 230) which may in turn send the text data 410 to the recognizers 363 corresponding to the domains included in the n-best list data 415 or otherwise indicated in the indicator. If the shortlister component 350 generates an n-best list representing domains without any associated confidence scores, the shortlister component 350/orchestrator component 230 may send the text data 410 to recognizers 363 associated with domains that the shortlister component 350 determines may execute the user input. If the shortlister component 350 generates an n-best list representing domains with associated confidence scores, the shortlister component 350/orchestrator component 230 may send the text data 410 to recognizers 363 associated with domains associated with confidence scores satisfying (e.g., meeting or exceeding) a threshold minimum confidence score.

A recognizer 363 may output tagged text data generated by an NER component 362 and an IC component 364, as described herein above. The NLU component 260 may compile the output tagged text data of the recognizers 363 into a single cross-domain n-best list 440 and may send the cross-domain n-best list 440 to a pruning component 450. Each entry of tagged text (e.g., each NLU hypothesis) represented in the cross-domain n-best list data 440 may be associated with a respective score indicating a likelihood that the NLU hypothesis corresponds to the domain associated with the recognizer 363 from which the NLU hypothesis was output. For example, the cross-domain n-best list data 440 may be represented as (with each line corresponding to a different NLU hypothesis):

[0.95] Intent: <PlayMusic> ArtistName: Lady Gaga SongName: Poker Face

[0.70] Intent: <PlayVideo> ArtistName: Lady Gaga VideoName: Poker Face

[0.01] Intent: <PlayMusic> ArtistName: Lady Gaga AlbumName: Poker Face

[0.01] Intent: <PlayMusic> SongName: Pokerface

The pruning component 450 may sort the NLU hypotheses represented in the cross-domain n-best list data 440 according to their respective scores. The pruning component 450 may perform score thresholding with respect to the cross-domain NLU hypotheses. For example, the pruning component 450 may select NLU hypotheses associated with scores satisfying (e.g., meeting and/or exceeding) a threshold score. The pruning component 450 may also or alternatively perform number of NLU hypothesis thresholding. For example, the pruning component 450 may select the top scoring NLU hypothesis(es). The pruning component 450 may output a portion of the NLU hypotheses input thereto. The purpose of the pruning component 450 is to create a reduced list of NLU hypotheses so that downstream, more resource intensive, processes may only operate on the NLU hypotheses that most likely represent the user's intent.

The NLU component 260 may include a light slot filler component 452. The light slot filler component 452 can take text from slots represented in the NLU hypotheses output by the pruning component 450 and alter them to make the text more easily processed by downstream components. The light slot filler component 452 may perform low latency operations that do not involve heavy operations such as reference to a knowledge base. The purpose of the light slot filler component 452 is to replace words with other words or values that may be more easily understood by downstream components. For example, if a NLU hypothesis includes the word "tomorrow," the light slot filler component 452 may replace the word "tomorrow" with an actual date for purposes of downstream processing. Similarly, the light slot filler component 452 may replace the word "CD" with "album" or the words "compact disc." The replaced words are then included in the cross-domain n-best list data 460.

The cross-domain n-best list data 460 may be input to an entity resolution component 470. The entity resolution component 470 can apply rules or other instructions to standardize labels or tokens from previous stages into an intent/slot representation. The precise transformation may depend on the domain. For example, for a travel domain, the entity resolution component 470 may transform text corresponding to "Boston airport" to the standard BOS three-letter code referring to the airport. The entity resolution component 470 can refer to a knowledge base that is used to specifically identify the precise entity referred to in each slot of each NLU hypothesis represented in the cross-domain n-best list data 460. Specific intent/slot combinations may also be tied to a particular source, which may then be used to resolve the text. In the example "play songs by the stones," the entity resolution component 470 may reference a personal music catalog, Amazon Music account, a user profile, or the like. The entity resolution component 470 may output an altered n-best list that is based on the cross-domain n-best list 460 but that includes more detailed information (e.g., entity IDs) about the specific entities mentioned in the slots and/or more detailed slot data that can eventually be used by a skill. The NLU component 260 may include multiple entity resolution components 470 and each entity resolution component 470 may be specific to one or more domains.

The NLU component 260 may include a reranker 490. The reranker 490 may assign a particular confidence score to each NLU hypothesis input therein. The confidence score of a particular NLU hypothesis may be affected by whether the NLU hypothesis has unfilled slots. For example, if a NLU hypothesis includes slots that are all filled/resolved, that NLU hypothesis may be assigned a higher confidence score than another NLU hypothesis including at least some slots that are unfilled/unresolved by the entity resolution component 470.

The reranker 490 may apply re-scoring, biasing, or other techniques. The reranker 490 may consider not only the data output by the entity resolution component 470, but may also consider other data 491. The other data 491 may include a variety of information. For example, the other data 491 may include skill rating or popularity data. For example, if one skill has a high rating, the reranker 490 may increase the score of a NLU hypothesis that may be processed by the skill. The other data 491 may also include information about skills that have been enabled by the user that originated the user input. For example, the reranker 490 may assign higher scores to NLU hypothesis that may be processed by enabled skills than NLU hypothesis that may be processed by non-enabled skills. The other data 491 may also include data indicating user usage history, such as if the user that originated the user input regularly uses a particular skill or does so at particular times of day. The other data 491 may additionally include data indicating date, time, location, weather, type of device 110, user identifier, context, as well as other information. For example, the reranker 490 may consider when any particular skill is currently active (e.g., music being played, a game being played, etc.).

As illustrated and described, the entity resolution component 470 is implemented prior to the reranker 490. The entity resolution component 470 may alternatively be implemented after the reranker 490. Implementing the entity resolution component 470 after the reranker 490 limits the NLU hypotheses processed by the entity resolution component 470 to only those hypotheses that successfully pass through the reranker 490.

The reranker 490 may be a global reranker (e.g., one that is not specific to any particular domain). Alternatively, the NLU component 260 may implement one or more domain-specific rerankers. Each domain-specific reranker may rerank NLU hypotheses associated with the domain. Each domain-specific reranker may output an n-best list of reranked hypotheses (e.g., 5-10 hypotheses).

The NLU component 260 may perform NLU processing described above with respect to domains associated with skills wholly implemented as part of the system(s) 120 (e.g., designated 290 in FIG. 2). The NLU component 260 may separately perform NLU processing described above with respect to domains associated with skills that are at least partially implemented as part of the skill system(s) 125. In an example, the shortlister component 350 may only process with respect to these latter domains. Results of these two NLU processing paths may be merged into NLU output data 485, which may be sent to a post-NLU ranker 265, which may be implemented by the system(s) 120.

The post-NLU ranker 265 may include a statistical component that produces a ranked list of intent/skill pairs with associated confidence scores. Each confidence score may indicate an adequacy of the skill's execution of the intent with respect to NLU results data associated with the skill. The post-NLU ranker 265 may operate one or more trained models configured to process the NLU results data 485, skill result data 430, and the other data 420 in order to output ranked output data 425. The ranked output data 425 may include an n-best list where the NLU hypotheses in the NLU results data 485 are reordered such that the n-best list in the ranked output data 425 represents a prioritized list of skills to respond to a user input as determined by the post-NLU ranker 265. The ranked output data 425 may also include (either as part of an n-best list or otherwise) individual respective scores corresponding to skills where each score indicates a probability that the skill (and/or its respective result data) corresponds to the user input.

The system may be configured with thousands, tens of thousands, etc. skills. The post-NLU ranker 265 enables the system to better determine the best skill to execute the user input. For example, first and second NLU hypotheses in the NLU results data 485 may substantially correspond to each other (e.g., their scores may be significantly similar), even though the first NLU hypothesis may be processed by a first skill and the second NLU hypothesis may be processed by a second skill. The first NLU hypothesis may be associated with a first confidence score indicating the system's confidence with respect to NLU processing performed to generate the first NLU hypothesis. Moreover, the second NLU hypothesis may be associated with a second confidence score indicating the system's confidence with respect to NLU processing performed to generate the second NLU hypothesis. The first confidence score may be similar or identical to the second confidence score. The first confidence score and/or the second confidence score may be a numeric value (e.g., from 0.0 to 1.0). Alternatively, the first confidence score and/or the second confidence score may be a binned value (e.g., low, medium, high).

The post-NLU ranker 265 (or other scheduling component such as orchestrator component 230) may solicit the first skill and the second skill to provide potential result data 430 based on the first NLU hypothesis and the second NLU hypothesis, respectively. For example, the post-NLU ranker 265 may send the first NLU hypothesis to the first skill 290a along with a request for the first skill 290a to at least partially execute with respect to the first NLU hypothesis. The post-NLU ranker 265 may also send the second NLU hypothesis to the second skill 290b along with a request for the second skill 290b to at least partially execute with respect to the second NLU hypothesis. The post-NLU ranker 265 receives, from the first skill 290a, first result data 430a generated from the first skill 290a's execution with respect to the first NLU hypothesis. The post-NLU ranker 265 also receives, from the second skill 290b, second results data 430b generated from the second skill 290b's execution with respect to the second NLU hypothesis.

The result data 430 may include various portions. For example, the result data 430 may include content (e.g., audio data, text data, and/or video data) to be output to a user. The result data 430 may also include a unique identifier used by the system(s) 120 and/or the skill system(s) 125 to locate the data to be output to a user. The result data 430 may also include an instruction. For example, if the user input corresponds to "turn on the light," the result data 430 may include an instruction causing the system to turn on a light associated with a profile of the device (110a/110b) and/or user.

The post-NLU ranker 265 may consider the first result data 430a and the second result data 430b to alter the first confidence score and the second confidence score of the first NLU hypothesis and the second NLU hypothesis, respectively. That is, the post-NLU ranker 265 may generate a third confidence score based on the first result data 430a and the first confidence score. The third confidence score may correspond to how likely the post-NLU ranker 265 determines the first skill will correctly respond to the user input. The post-NLU ranker 265 may also generate a fourth confidence score based on the second result data 430b and the second confidence score. One skilled in the art will appreciate that a first difference between the third confidence score and the fourth confidence score may be greater than a second difference between the first confidence score and the second confidence score. The post-NLU ranker 265 may also consider the other data 420 to generate the third confidence score and the fourth confidence score. While it has been described that the post-NLU ranker 265 may alter the confidence scores associated with first and second NLU hypotheses, one skilled in the art will appreciate that the post-NLU ranker 265 may alter the confidence scores of more than two NLU hypotheses. The post-NLU ranker 265 may select the result data 430 associated with the skill 290 with the highest altered confidence score to be the data output in response to the current user input. The post-NLU ranker 265 may also consider the text data 410 to alter the NLU hypotheses confidence scores.

The orchestrator component 230 may, prior to sending the NLU results data 485 to the post-NLU ranker 265, associate intents in the NLU hypotheses with skills 290. For example, if a NLU hypothesis includes a <PlayMusic> intent, the orchestrator component 230 may associate the NLU hypothesis with one or more skills 290 that can execute the <PlayMusic> intent. Thus, the orchestrator component 230 may send the NLU results data 485, including NLU hypotheses paired with skills 290, to the post-NLU ranker 265. In response to text data 410 corresponding to "what should I do for dinner today," the orchestrator component 230 may generates pairs of skills 290 with associated NLU hypotheses corresponding to:

Skill 1/NLU hypothesis including <Help> intent
Skill 2/NLU hypothesis including <Order> intent
Skill 3/NLU hypothesis including <DishType> intent The post-NLU ranker 265 queries each skill 290, paired with a NLU hypothesis in the NLU output data 485, to provide result data 430 based on the NLU hypothesis with which it is associated. That is, with respect to each skill, the post-NLU ranker 265 colloquially asks the each skill "if given this NLU hypothesis, what would you do with it." According to the above example, the post-NLU ranker 265 may send skills 290 the following data:

Skill 1: First NLU hypothesis including <Help> intent indicator
Skill 2: Second NLU hypothesis including <Order> intent indicator
Skill 3: Third NLU hypothesis including <DishType> intent indicator The post-NLU ranker 265 may query each of the skills 290 in parallel or substantially in parallel.

A skill 290 may provide the post-NLU ranker 265 with various data and indications in response to the post-NLU ranker 265 soliciting the skill 290 for result data 430. A skill 290 may simply provide the post-NLU ranker 265 with an indication of whether or not the skill can execute with respect to the NLU hypothesis it received. A skill 290 may also or alternatively provide the post-NLU ranker 265 with output data generated based on the NLU hypothesis it received. In some situations, a skill 290 may need further information in addition to what is represented in the received NLU hypothesis to provide output data responsive to the user input. In these situations, the skill 290 may provide the post-NLU ranker 265 with result data 430 indicating slots of a framework that the skill 290 further needs filled or entities that the skill 290 further needs resolved prior to the skill 290 being able to provided result data 430 responsive to the user input. The skill 290 may also provide the post-NLU ranker 265 with an instruction and/or computer-generated speech indicating how the skill 290 recommends the system solicit further information needed by the skill 290. The skill 290 may further provide the post-NLU ranker 265 with an indication of whether the skill 290 will have all needed information after the user provides additional information a single time, or whether the skill 290 will need the user to provide various kinds of additional information prior to the skill 290 having all needed information. According to the above example, skills 290 may provide the post-NLU ranker 265 with the following:

Skill 1: indication representing the skill can execute with respect to a NLU hypothesis including the <Help> intent indicator Skill 2: indication representing the skill needs to the system to obtain further information Skill 3: indication representing the skill can provide numerous results in response to the third NLU hypothesis including the <DishType> intent indicator Result data 430 includes an indication provided by a skill 290 indicating whether or not the skill 290 can execute with respect to a NLU hypothesis; data generated by a skill 290 based on a NLU hypothesis; as well as an indication provided by a skill 290 indicating the skill 290 needs further information in addition to what is represented in the received NLU hypothesis.

The post-NLU ranker 265 uses the result data 430 provided by the skills 290 to alter the NLU processing confidence scores generated by the reranker 490. That is, the post-NLU ranker 265 uses the result data 430 provided by the queried skills 290 to create larger differences between the NLU processing confidence scores generated by the reranker 490. Without the post-NLU ranker 265, the system may not be confident enough to determine an output in response to a user input, for example when the NLU hypotheses associated with multiple skills are too close for the system to confidently determine a single skill 290 to invoke to respond to the user input. For example, if the system does not implement the post-NLU ranker 265, the system may not be able to determine whether to obtain output data from a general reference information skill or a medical information skill in response to a user input corresponding to "what is acne."

The post-NLU ranker 265 may prefer skills 290 that provide result data 430 responsive to NLU hypotheses over skills 290 that provide result data 430 corresponding to an indication that further information is needed, as well as skills 290 that provide result data 430 indicating they can provide multiple responses to received NLU hypotheses. For example, the post-NLU ranker 265 may generate a first score for a first skill 290a that is greater than the first skill's NLU confidence score based on the first skill 290a providing result data 230a including a response to a NLU hypothesis. For further example, the post-NLU ranker 265 may generate a second score for a second skill 290b that is less than the second skill's NLU confidence score based on the second skill 290b providing result data 430b indicating further information is needed for the second skill 290b to provide a response to a NLU hypothesis. Yet further, for example, the post-NLU ranker 265 may generate a third score for a third skill 290c that is less than the third skill's NLU confidence score based on the third skill 290c providing result data 430c indicating the third skill 290c can provide multiple responses to a NLU hypothesis.

The post-NLU ranker 265 may consider other data 420 in determining scores. The other data 420 may include rankings associated with the queried skills 290. A ranking may be a system ranking or a user-specific ranking. A ranking may indicate a veracity of a skill from the perspective of one or more users of the system. For example, the post-NLU ranker 265 may generate a first score for a first skill 290a that is greater than the first skill's NLU processing confidence score based on the first skill 290a being associated with a high ranking. For further example, the post-NLU ranker 265 may generate a second score for a second skill 290b that is less than the second skill's NLU processing confidence score based on the second skill 290b being associated with a low ranking.

The other data 420 may include information indicating whether or not the user that originated the user input has enabled one or more of the queried skills 290. For example, the post-NLU ranker 265 may generate a first score for a first skill 290a that is greater than the first skill's NLU processing confidence score based on the first skill 290a being enabled by the user that originated the user input. For further example, the post-NLU ranker 265 may generate a second score for a second skill 290b that is less than the second skill's NLU processing confidence score based on the second skill 290b not being enabled by the user that originated the user input. When the post-NLU ranker 265 receives the NLU results data 485, the post-NLU ranker 265 may determine whether profile data, associated with the user and/or device that originated the user input, includes indications of enabled skills.

The other data 420 may include information indicating output capabilities of a device that will be used to output content, responsive to the user input, to the user. The system may include devices that include speakers but not displays, devices that include displays but not speakers, and devices that include speakers and displays. If the device that will output content responsive to the user input includes one or more speakers but not a display, the post-NLU ranker 265 may increase the NLU processing confidence score associated with a first skill configured to output audio data and/or decrease the NLU processing confidence score associated with a second skill configured to output visual data (e.g., image data and/or video data). If the device that will output content responsive to the user input includes a display but not one or more speakers, the post-NLU ranker 265 may increase the NLU processing confidence score associated with a first skill configured to output visual data and/or decrease the NLU processing confidence score associated with a second skill configured to output audio data.

The other data 420 may include information indicating the veracity of the result data 430 provided by a skill 290. For example, if a user says "tell me a recipe for pasta sauce," a first skill 290a may provide the post-NLU ranker 265 with first result data 430a corresponding to a first recipe associated with a five star rating and a second skill 290b may provide the post-NLU ranker 265 with second result data 430b corresponding to a second recipe associated with a one star rating. In this situation, the post-NLU ranker 265 may increase the NLU processing confidence score associated with the first skill 290a based on the first skill 290a providing the first result data 430a associated with the five star rating and/or decrease the NLU processing confidence score associated with the second skill 290b based on the second skill 290b providing the second result data 430b associated with the one star rating.

The other data 420 may include information indicating the type of device that originated the user input. For example, the device may correspond to a "hotel room" type if the device is located in a hotel room. If a user inputs a command corresponding to "order me food" to the device located in the hotel room, the post-NLU ranker 265 may increase the NLU processing confidence score associated with a first skill 290a corresponding to a room service skill associated with the hotel and/or decrease the NLU processing confidence score associated with a second skill 290b corresponding to a food skill not associated with the hotel.

The other data 420 may include information indicating a location of the device and/or user that originated the user input. The system may be configured with skills 290 that may only operate with respect to certain geographic locations. For example, a user may provide a user input corresponding to "when is the next train to Portland." A first skill 290a may operate with respect to trains that arrive at, depart from, and pass through Portland, Oreg. A second skill 290b may operate with respect to trains that arrive at, depart from, and pass through Portland, Me. If the device and/or user that originated the user input is located in Seattle, Wash., the post-NLU ranker 265 may increase the NLU processing confidence score associated with the first skill 290a and/or decrease the NLU processing confidence score associated with the second skill 290b. Likewise, if the device and/or user that originated the user input is located in Boston, Mass., the post-NLU ranker 265 may increase the NLU processing confidence score associated with the second skill 290b and/or decrease the NLU processing confidence score associated with the first skill 290a.

The other data 420 may include information indicating a time of day. The system may be configured with skills 290 that operate with respect to certain times of day. For example, a user may provide a user input corresponding to "order me food." A first skill 290a may generate first result data 430a corresponding to breakfast. A second skill 290b may generate second result data 430b corresponding to dinner. If the system(s) 120 receives the user input in the morning, the post-NLU ranker 265 may increase the NLU processing confidence score associated with the first skill 290a and/or decrease the NLU processing score associated with the second skill 290b. If the system(s) 120 receives the user input in the afternoon or evening, the post-NLU ranker 265 may increase the NLU processing confidence score associated with the second skill 290b and/or decrease the NLU processing confidence score associated with the first skill 290a.

The other data 420 may include information indicating user preferences. The system may include multiple skills 290 configured to execute in substantially the same manner. For example, a first skill 290a and a second skill 290b may both be configured to order food from respective restaurants. The system may store a user preference (e.g., in the profile storage 270) that is associated with the user that provided the user input to the system(s) 120 as well as indicates the user prefers the first skill 290a over the second skill 290b. Thus, when the user provides a user input that may be executed by both the first skill 290a and the second skill 290b, the post-NLU ranker 265 may increase the NLU processing confidence score associated with the first skill 290a and/or decrease the NLU processing confidence score associated with the second skill 290b.

The other data 420 may include information indicating system usage history associated with the user that originated the user input. For example, the system usage history may indicate the user originates user inputs that invoke a first skill 290a more often than the user originates user inputs that invoke a second skill 290b. Based on this, if the present user input may be executed by both the first skill 290a and the second skill 290b, the post-NLU ranker 265 may increase the NLU processing confidence score associated with the first skill 290a and/or decrease the NLU processing confidence score associated with the second skill 290b.

The other data 420 may include information indicating a speed at which the device 110 that originated the user input is traveling. For example, the device 110 may be located in a moving vehicle, or may be a moving vehicle. When a device 110 is in motion, the system may prefer audio outputs rather than visual outputs to decrease the likelihood of distracting the user (e.g., a driver of a vehicle). Thus, for example, if the device 110 that originated the user input is moving at or above a threshold speed (e.g., a speed above an average user's walking speed), the post-NLU ranker 265 may increase the NLU processing confidence score associated with a first skill 290a that generates audio data. The post-NLU ranker 265 may also or alternatively decrease the NLU processing confidence score associated with a second skill 290b that generates image data or video data.

The other data 420 may include information indicating how long it took a skill 290 to provide result data 430 to the post-NLU ranker 265. When the post-NLU ranker 265 multiple skills 290 for result data 430, the skills 290 may respond to the queries at different speeds. The post-NLU ranker 265 may implement a latency budget. For example, if the post-NLU ranker 265 determines a skill 290 responds to the post-NLU ranker 265 within a threshold amount of time from receiving a query from the post-NLU ranker 265, the post-NLU ranker 265 may increase the NLU processing confidence score associated with the skill 290. Conversely, if the post-NLU ranker 265 determines a skill 290 does not respond to the post-NLU ranker 265 within a threshold amount of time from receiving a query from the post-NLU ranker 265, the post-NLU ranker 265 may decrease the NLU processing confidence score associated with the skill 290.

It has been described that the post-NLU ranker 265 uses the other data 420 to increase and decrease NLU processing confidence scores associated with various skills 290 that the post-NLU ranker 265 has already requested result data from. Alternatively, the post-NLU ranker 265 may use the other data 420 to determine which skills 290 to request result data from. For example, the post-NLU ranker 265 may use the other data 420 to increase and/or decrease NLU processing confidence scores associated with skills 290 associated with the NLU results data 485 output by the NLU component 260. The post-NLU ranker 265 may select n-number of top scoring altered NLU processing confidence scores. The post-NLU ranker 265 may then request result data 430 from only the skills 290 associated with the selected n-number of NLU processing confidence scores.

As described, the post-NLU ranker 265 may request result data 430 from all skills 290 associated with the NLU results data 485 output by the NLU component 260. Alternatively, the system(s) 120 may prefer result data 430 from skills implemented entirely by the system(s) 120 rather than skills at least partially implemented by the skill system(s) 125. Therefore, in the first instance, the post-NLU ranker 265 may request result data 430 from only skills associated with the NLU results data 485 and entirely implemented by the system(s) 120. The post-NLU ranker 265 may only request result data 430 from skills associated with the NLU results data 485, and at least partially implemented by the skill system(s) 125, if none of the skills, wholly implemented by the system(s) 120, provide the post-NLU ranker 265 with result data 430 indicating either data response to the NLU results data 485, an indication that the skill can execute the user input, or an indication that further information is needed.

As indicated above, the post-NLU ranker 265 may request result data 430 from multiple skills 290. If one of the skills 290 provides result data 430 indicating a response to a NLU hypothesis and the other skills provide result data 430 indicating either they cannot execute or they need further information, the post-NLU ranker 265 may select the result data 430 including the response to the NLU hypothesis as the data to be output to the user. If more than one of the skills 290 provides result data 430 indicating responses to NLU hypotheses, the post-NLU ranker 265 may consider the other data 420 to generate altered NLU processing confidence scores, and select the result data 430 of the skill associated with the greatest score as the data to be output to the user.

A system that does not implement the post-NLU ranker 265 may select the highest scored NLU hypothesis in the NLU results data 485. The system may send the NLU hypothesis to a skill 290 associated therewith along with a request for output data. In some situations, the skill 290 may not be able to provide the system with output data. This results in the system indicating to the user that the user input could not be processed even though another skill associated with lower ranked NLU hypothesis could have provided output data responsive to the user input.

The post-NLU ranker 265 reduces instances of the aforementioned situation. As described, the post-NLU ranker 265 queries multiple skills associated with the NLU results data 485 to provide result data 430 to the post-NLU ranker 265 prior to the post-NLU ranker 265 ultimately determining the skill 290 to be invoked to respond to the user input. Some of the skills 290 may provide result data 430 indicating responses to NLU hypotheses while other skills 290 may providing result data 430 indicating the skills cannot provide responsive data. Whereas a system not implementing the post-NLU ranker 265 may select one of the skills 290 that could not provide a response, the post-NLU ranker 265 only selects a skill 290 that provides the post-NLU ranker 265 with result data corresponding to a response, indicating further information is needed, or indicating multiple responses can be generated.

The post-NLU ranker 265 may select result data 430, associated with the skill 290 associated with the highest score, for output to the user. Alternatively, the post-NLU ranker 265 may output ranked output data 425 indicating skills 290 and their respective post-NLU ranker rankings. Since the post-NLU ranker 265 receives result data 430, potentially corresponding to a response to the user input, from the skills 290 prior to post-NLU ranker 265 selecting one of the skills or outputting the ranked output data 425, little to no latency occurs from the time skills provide result data 430 and the time the system outputs responds to the user.

If the post-NLU ranker 265 selects result audio data to be output to a user and the system determines content should be output audibly, the post-NLU ranker 265 (or another component of the system(s) 120) may cause the device 110*a* and/or the device 110*b* to output audio corresponding to the result audio data. If the post-NLU ranker 265 selects result text data to output to a user and the system determines content should be output visually, the post-NLU ranker 265 (or another component of the system(s) 120) may cause the device 110*b* to display text corresponding to the result text data. If the post-NLU ranker 265 selects result audio data to output to a user and the system determines content should be output visually, the post-NLU ranker 265 (or another component of the system(s) 120) may send the result audio data to the ASR component 250. The ASR component 250 may generate output text data corresponding to the result audio data. The system(s) 120 may then cause the device 110*b* to display text corresponding to the output text data. If the post-NLU ranker 265 selects result text data to output to a user and the system determines content should be output audibly, the post-NLU ranker 265 (or another component of the system(s) 120) may send the result text data to the TTS component 280. The TTS component 280 may generate output audio data (corresponding to computer-generated speech) based on the result text data. The system(s) 120 may then cause the device 110*a* and/or the device 110*b* to output audio corresponding to the output audio data.

As described, a skill 290 may provide result data 430 either indicating a response to the user input, indicating more information is needed for the skill 290 to provide a response to the user input, or indicating the skill 290 cannot provide a response to the user input. If the skill 290 associated with the highest post-NLU ranker score provides the post-NLU ranker 265 with result data 430 indicating a response to the user input, the post-NLU ranker 265 (or another component of the system(s) 120, such as the orchestrator component 230) may simply cause content corresponding to the result data 430 to be output to the user. For example, the post-NLU ranker 265 may send the result data 430 to the orchestrator component 230. The orchestrator component 230 may cause the result data 230 to be sent to the device (110*a*/110*b*), which may output audio and/or display text corresponding to the result data 230. The orchestrator component 230 may send the result data 430 to the ASR component 250 to generate output text data and/or may send the result data 430 to the TTS component 280 to generate output audio data, depending on the situation.

The skill 290 associated with the highest post-NLU ranker score may provide the post-NLU ranker 265 with result data 430 indicating more information is needed as well as instruction data. The instruction data may indicate how the skill 290 recommends the system obtain the needed information. For example, the instruction data may correspond to text data or audio data (i.e., computer-generated speech) corresponding to "please indicate _____." The instruction data may be in a format (e.g., text data or audio data) capable of being output by the device (110*a*/110*b*). When this occurs, the post-NLU ranker 265 may simply cause the received instruction data be output by the device (110*a*/110*b*). Alternatively, the instruction data may be in a format that is not capable of being output by the device (110*a*/110*b*). When this occurs, the post-NLU ranker 265 may cause the ASR component 250 or the TTS component 280 to process the instruction data, depending on the situation, to generate instruction data that may be output by the device (110*a*/110*b*). Once the user provides the system with all further information needed by the skill 290, the skill 290 may provide the system with result data 430 indicating a response to the user input, which may be output by the system as detailed above.

The system may include "informational" skills 290 that simply provide the system with information, which the system outputs to the user. The system may also include "transactional" skills 290 that require a system instruction to execute the user input. Transactional skills 290 include ride sharing skills, flight booking skills, etc. A transactional skill 290 may simply provide the post-NLU ranker 265 with result data 430 indicating the transactional skill 290 can execute the user input. The post-NLU ranker 265 may then cause the system to solicit the user for an indication that the system is permitted to cause the transactional skill 290 to execute the user input. The user-provided indication may be an audible indication or a tactile indication (e.g., activation of a virtual button or input of text via a virtual keyboard). In response to receiving the user-provided indication, the system may provide the transactional skill 290 with data corresponding to the indication. In response, the transactional skill 290 may execute the command (e.g., book a flight, book a train ticket, etc.). Thus, while the system may not further engage an informational skill 290 after the informational skill 290 provides the post-NLU ranker 265 with result data 430, the system may further engage a transactional skill 290 after the transactional skill 290 provides the post-NLU ranker 265 with result data 430 indicating the transactional skill 290 may execute the user input.

In some instances, the post-NLU ranker 265 may generate respective scores for first and second skills that are too close (e.g., are not different by at least a threshold difference) for the post-NLU ranker 265 to make a confident determination regarding which skill should execute the user input. When this occurs, the system may request the user indicate which skill the user prefers to execute the user input. The system may output TTS-generated speech to the user to solicit which skill the user wants to execute the user input.

Figure 5:
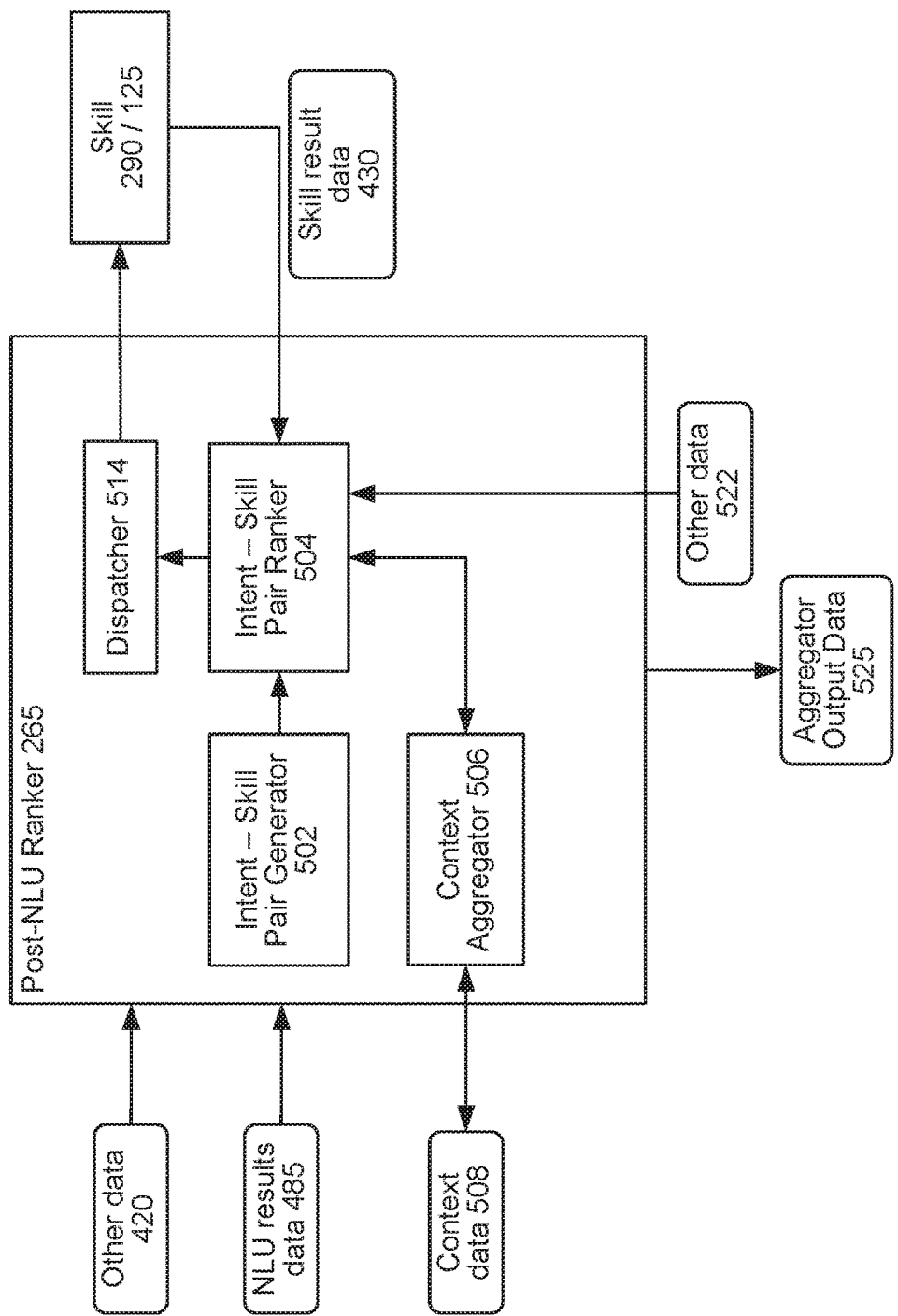
FIG. 5 is a conceptual diagram illustrating how a post-NLU ranker may process according to embodiments of the present disclosure.

FIG. 5 illustrates other configurations and operations of the post-NLU ranker 265. When the post-NLU ranker 265 receives NLU results data 485, the NLU results data 485 may be sent to an intent-skill pair generator 502. The intent-skill pair generator 502 may include information about what skills are capable of handling what intents. Such information may be context agnostic, and may thus indicate what skills are capable of handling what intents generally, without regard to the context associated with the user input. The intent-skill pair generator 502 thus receives the NLU results data 485 and identifies what particular candidate skills may handle the intent for NLU hypothesis. For example, if a NLU hypothesis includes a particular intent, the intent-skill pair generator 502 identifies each skill that may execute with respect to the intent. For further example, if the NLU results data 485 include multiple NLU hypotheses including multiple intents, the intent-skill pair generator 502 associates each different NLU hypothesis with each skill that may execute with respect to the NLU hypothesis. As illustrated, the intent-skill pair generator 502 may be implemented at part of the post-NLU ranker 265. However, one skill in the art will appreciate that the intent-skill pair generator 502 may be implemented as part of the NLU component 260 or in another component without departing from the present disclosure. In such a case, the NLU results data 485 may include intent-skill pairs.

The post-NLU ranker 265 may also include an intent-skill pair ranker 504. The intent-skill pair ranker 504 ranks the intent-skill pairs generated by the intent-skill pair generator 502 based on, for example, the number of filled slots of a NLU hypothesis, an NLU confidence score associated with a NLU hypothesis, context information output by a context aggregator 506, and/or other data.

The post-NLU ranker 265 may include the context aggregator 506. The context aggregator 506 receives context data 508 from various contextual sources. The context data 508 may include time data, which represents a time of receipt of the user input by the device 110, a time or receipt of the user input by the system(s) 120, a user identifier associated with the user input, a device identifier of the device 110, whether other devices are linked to the device 110, and/or other information. The context aggregator 506 may aggregate the context data 508 and put the context data 508 in a form that can be processed by the intent-skill pair ranker 504. Context data 508 may include data obtained from the device 110 or from other services connected to the system(s) 120.

The context data 508 may include skill availability data. Such information may indicate what skills are available and authorized to process the user input. For example, if the user has only enabled certain skills, the enabled skills may be noted in the skill availability data.

The context data 508 may also include dialog data. A "dialog" or "dialog session" as used herein may refer to data transmissions (such as relating to multiple user inputs and system(s) 120 outputs) between the system(s) 120 and a local device (e.g., the device 110) that all relate to a single originating user input. Thus, the data transmissions of a dialog session may share a dialog identifier or other unique identifier that may be used by the orchestrator component 230, skill(s) 290, skill server(s) 125, etc. to track information across the dialog session. For example, the device 110 may send the system(s) 120 data corresponding to "Alexa, play trivia." The system(s) 120 may output data corresponding to a trivia statement to the device 110 for output to a user(s). A user may then respond to the statement, which the device 110 sends as data to the system(s) 120. The sending of data from the device 110 to the system(s) 120 and the sending of data from the system(s) 120 to the device 110 may all correspond to a single dialog session related to the originating user input "play trivia." In some examples, a dialog-initiating user input may start with a wakeword and end with a command, such as "Alexa, play trivia," where "Alexa" is the wakeword and "play trivia" is the command. Subsequent user inputs of the same dialog session may or may not start with speaking of a wakeword. Each user input of a dialog may be associated with a unique user input identifier such that multiple user input identifiers may be associated with a single dialog session identifier.

Dialog data may include interactive focus information, (e.g., representing which skill was most recently invoked to execute a previous user input for the user and/or device 110 associated with the present user input). Dialog data may also include content focus information (e.g., representing a skill that is streaming data to the device 110 when the data corresponding to the current user input is received by the system(s) 120). The context data 508 may be one portion of the data used by the intent-skill pair ranker 504 to determine which skill should execute the current user input. Thus, unlike certain systems that use interactive focus and content focus as binary determinations regarding which skill should execute a current user input, the presently disclosed architecture considers focus along with other data, thereby minimizing disproportionate routing.

The context data 508 may also include device data. Device data may indicate characteristics of the device 110 from which the user input was received. For example, such data may include information such as display capabilities of the device, a quality of one or more speakers of the device, a device type, etc. Certain capabilities of a solo device or group of devices may be stored with the system and looked up during a particular interaction to determine if a device/group of devices can handle a go-back request. Device data may also represent a skill with which the device 110 is associated. The device data may also indicate whether the device 110 is currently streaming data or was streaming data when the user input was received and sent to the system(s) 120. The context data 508 (and/or other data 522) may include a metadata flag/indicator that represents whether the particular skill being executed is one that can handle a go-back (or other navigational) request.

The context data 508 may also include user profile data. The user profile data may represent preferences and/or characteristics of the user that originated the current user input. Such data may be received from the profile storage 270.

The context data 508 may also include location data. The location data may represent a location of the device 110 from which the user input was received.

The context data 508 may also include anaphora data. Anaphora data may be data used to resolve anaphora, exophora, or other references (like pronouns such as he, she, etc.) to entities that are not explicitly named in a user input. The anaphora data may include entity identifiers or other information used to resolve anaphoric references in a user input.

The context data 508 may also include data regarding whether one or more skills are "in focus." A skill may be in interactive focus, meaning the skill was the most recent skill that executed a user input for a user or device associated with a present user input and/or the skill may be involved with an open dialog (e.g., series of user inputs and responses) with a user device. Interactive focus attempts to continue a conversation between a user and the system and/or a skill for purposes of processing the dialog. However, there may be instances where a user inputs a command that may be handled by a skill that is currently in interactive focus, but which the user does not intend to be executed by such skill. The system may process the context data 508 and other data to determine how best to process a user input when one or more skills may be in focus.

A skill may alternatively be in content focus, meaning the skill is associated with content that is streaming to the user and/or device associated with a current user input when the current user input is received by the system. For example, a previous user input of "Play music" may result in the system streaming music to a device from a specific music skill. While the skill is streaming the music, the same user may input a second user input. Since the second user input was received when the music skill was streaming the music, the system may query that music skill in the first instance, even if the second user input is not necessarily intended for the music skill. The music skill may be configured to attempt to execute the subsequent user input (and potentially output an error) even though the user may have intended another skill to execute such user input.

The context data 508 may also include data regarding skill sessions that may be determined from session data storage 605 of FIG. 6. For example, the session data storage 605 may store a skill session identifier and a skill identifier identifying the skill associated with the skill session. The session data storage 605 may also store status data indicating the status/state of the skill session. For example, a skill session may be in an active state, a suspended state, or a terminated state. The context data 508 may include the status data of various skill sessions, and the post-NLU ranker 265 may use that information to determine if the intent corresponds to one of the skills associated with the skill sessions. For example, the intent may correspond to a first skill associated with a first skill session that is an active state, or the intent may correspond to a second skill associated with a second skill session that is in a suspended state.

The context data 508 may also include other context data not explicitly recited herein.

The intent-skill pair ranker 504 may operate one or more trained models that are configured to process the NLU results data 485, skill result data 430, and other data 522 in order to determine a single best skill for executing the current user input from the available pairs output by the intent-skill pair generator 502. The intent-skill pair ranker 504 may send queries to the skills and request a first skill and a second skill (for example the candidate skills identified by the pair generator 502), to provide potential result data indicating whether the skill can handle the intent at the particular moment and if so, what the output data for the particular skill would be (e.g., data the skill would provide to a user if the skill were selected to execute the user input) based on the NLU results data 485. For example, the intent-skill pair ranker 504 may send a first NLU hypothesis, associated with a first skill, to the first skill along with a request for the first skill to at least partially execute with respect to the first NLU hypothesis. The intent-skill pair ranker 504 may also send a second NLU hypothesis, associated with the second skill, to the second skill along with a request for the second skill to at least partially execute with respect to the second NLU hypothesis. The intent-skill pair ranker 504 receives, from the first skill, first result data 430*a* generated from the first skill's execution with respect to the first NLU hypothesis. The intent-skill pair ranker 504 also receives, from the second skill, second results data 430*b* generated from the second skill's execution with respect to the second NLU hypothesis. Based on the first results data 430*a*, a first NLU confidence score associated with the first NLU hypothesis, the second results data 430*b*, a second NLU confidence score associated with the second NLU hypothesis, and other data 522 (e.g., context data, user profile data, etc.), the intent-skill pair ranker 504 determines the best skill for executing the current user input. The intent-skill pair ranker 504 sends an indication of the best skill to a dispatcher component 514.

The dispatcher 514 may then send the selected skill the information needed to execute the user input, including an indication of the intent, the appropriate context data 508 (such as device identifier, user identifier, or the like), slot data, utterance identifier, dialog identifier, or any other information needed.

One or more models implemented by components of the orchestrator component 230, post-NLU ranker 265, shortlister 350, or other component may be trained and operated according to various machine learning techniques.

FIG. 6 is a conceptual diagram illustrating additional components that the system 100 may use to process a request to pause/interrupt a skill and invoke another skill according to embodiments of the present disclosure. The system 100 may include a request router component 610 and a skill registration component 620. The components 610 and 620 may be implemented as part of the system(s) 120 or may be implemented outside of the system(s) 120 depending on the system configuration.

The orchestrator 230 may receive a user input in the form of audio data 211. The ASR component 250 may process the user input as described in connection with FIG. 2A, and may forward the results (one or more ASR hypothesis) to the orchestrator 230.

In a patentable improvement in connection with the systems described herein, the NLU component 260 may be configured to output a 'mixed' N-best list of NLU hypothesis, where the mixed N-best list includes NLU hypothesis that correspond to a first type of intents and a second type intents. The first type of intents may be user requests that correspond to applications/skills that may be handled using the system(s) 120, rather than an external skill 290/skill system 225. The second type of intents may be user requests that can be handled by skills (e.g., skills 290) developed and managed externally to the system(s) 120 via the skill system(s) 125. The first type of intents may include, but are not limited to, a 'time' intent, a 'weather' intent, a 'set timer' intent, a 'set alarm' intent, a 'volume' intent, and the like. As described above in connection with FIG. 4, the NLU component 260 may determine NLU output data 485 representing multiple NLU hypotheses corresponding to the user input, where the NLU hypotheses may be associated with different skills. In the improved system described herein, the NLU output data 485 may include NLU hypotheses that correspond to the first type of intents and the second type of intents. In the traditional system, the NLU component may only process one type of intent based on data determined by the system(s) 120. That is, if the input intent is determined to be a first type of intent then the NLU component 260 may execute a particular pipeline consisting of particular components. If the input intent is determined to be a second type of intent then the NLU component 260 may execute a different pipeline consisting of different components. In an example embodiment of the improved system, the NLU component 260 may execute both first type of intents and second type of intents processing pipelines, and merge the results to construct the mixed N-best list. The NLU component 260 may send the mixed N-best list to the orchestrator 230.

In some embodiments, the NLU component 260 may be configured to support additional intents that allow a user to pause or interrupt an on-going skill and later resume the skill. For example, the NLU component 260 may be configured to support a PauseIntent, which may be determined as applicable to utterances that include the word "pause" and the skill name (e.g., "pause trivia") or that include just the word "pause" or other synonyms. The NLU component 260 may further be configured to support a ResumeIntent, which may be determined as applicable to utterances that include the word "resume" and the skill name (e.g., "resume trivia") or that include just the word "resume" or other synonyms.

In a non-limiting example, when a user asks for the time while the trivia skill is active, the NLU component 260 may output the following mixed N-best list including the first type of intent interpretations and the second type of intent interpretations. As shown, the second type of intent interpretation may be ranked higher or listed first in the N-best list as compared to the first type of intent interpretations:

NLU hypothesis 1: intent="AnswerQuestionIntent"; confidenceScores="MEDIUM"; tokens=<_____>; slot=<_____>

NLU hypothesis 2: intent="WhatTimeIntent'"; confidenceScores="HIGH"; tokens=<_____>; slot=<_____>

The orchestrator 230 may send the mixed N-best NLU list to the post-NLU ranker 265. As described above in connection with FIG. 5, the post-NLU ranker 265 is configured to process various data including the NLU results data 485, which may include the mixed N-best list, and is responsible for intent routing and skill selection. In the improved system described herein, the post-NLU ranker 265 may be configured to process the mixed N-best list from the NLU component 260 and select the appropriate interpretation for further processing. The post-NLU ranker 265 may override the position of the NLU hypothesis in the N-best list, and may select the first type of intent interpretation (even though it is not the top/best NLU hypothesis according to the N-best list). As described above, the post-NLU ranker 265 may also process context data 508, which may indicate which skill is 'in-focus' (interactive focus) with respect to the user profile. In the improved system described herein, the post-NLU ranker 265 may override (for example, not select) the focus-based skill candidate, enabling the user to interrupt or pause a skill that is in-focus.

In a non-limiting example, the post-NLU ranker 265 may implement a rule indicating if the N-best list includes the first type and the second type of intents (that is, the user is potentially requesting to interrupt/pause a skill that has interactive focus), and if the skill corresponding to the third-party intent interpretation in the N-best list has an active session and the confidence level is less than HIGH and the confidence level for the first type of intent interpretation is HIGH, then the post-NLU ranker is configured to recognize the first type intent interpretation as the top candidate.

The session manager component 285 may be configured to schedule the execution of requests, invoking the downstream request router component 610 to initiate the execution, and tracking the progress of the corresponding session. The session manager component 285 may consist of persistent storage in session data storage 605 for all sessions, their state, the relationship between sessions and the users, devices, and other resources associated with each session. The session data storage 605 may store data records 626, 627 each including a session identifier (to identify a session where a user is interacting with a skill), a skill identifier (to identify the skill the user is interacting with), status (e.g., active, suspended or terminated) and other data (e.g., whether a session can be resumed, duration time for resuming a session, etc.) The session manager component 285 may also track a relationship or other attributes between a first session and a second session. For example, the session manager component 285 may track a temporal relationship between the first and second session indicating that the first session/first skill was invoked before the second session/second skill. The session manager component 285 may also track that the first session/first skill was interrupted by the second session/second skill. That is, the second session/second skill was invoked while the first session/first skill was active. In some embodiments, the session data storage 605 may also include data identifying one or more resources being used by the skill for the skill session to generate output or process the user request.

The session manager component 285 may be configured to process a signal or message and determine the state of a skill session. For example, the session manager component 285 may receive a message from the orchestrator 230 to pause the current skill session and/or to invoke another skill, and the session manager component 285 determines to place the current skill session in a suspended state and/or initiate a new skill session corresponding to another skill. The session manager component 285 may receive a message from a skill indicating that it has completed its task, and may determine to place the corresponding skill session in a terminated state. In response to that skill session being in a terminated state, the session manager component 285 may determine that there is another skill session in a suspended state that can be placed in an active state, and may cause the previous skill session to resume. Further details of the operations of the session manager component 285 are described below in relation to FIGS. 7 and 8A-8D.

The request router component 610 may be configured to generate request objects that are compatible with target applications/skills, dispatching those requests, and processing the corresponding returned responses. The request router component 610 may also be responsible for processing the response from the skill after invocations. The request router component 610 may also detect the end of a dialog and forward requests to the session manager component 285.

The skill registration component 620 may be available to third-party skill developers to register skills for session suspend and resume callbacks, and optionally override the default experience. For the skills which opt-in to receive the suspend and resume callbacks, the system(s) 120 will invoke the skill when its session has been suspended and provide the reason of the suspension, so the skill will be able to persist the state of the interaction. For the skills which do not opt-in to receive the suspend and resume callbacks, a default experience offered by the system(s) 120 kicks in. The default experience may assume the skill session being suspended can be resumed, and re-prompts the user accordingly. During registration, a skill developer may provide information related to whether the skill can be paused, when the skill can be resumed, when the skill can be interrupted, and other related data.

Figure 7:
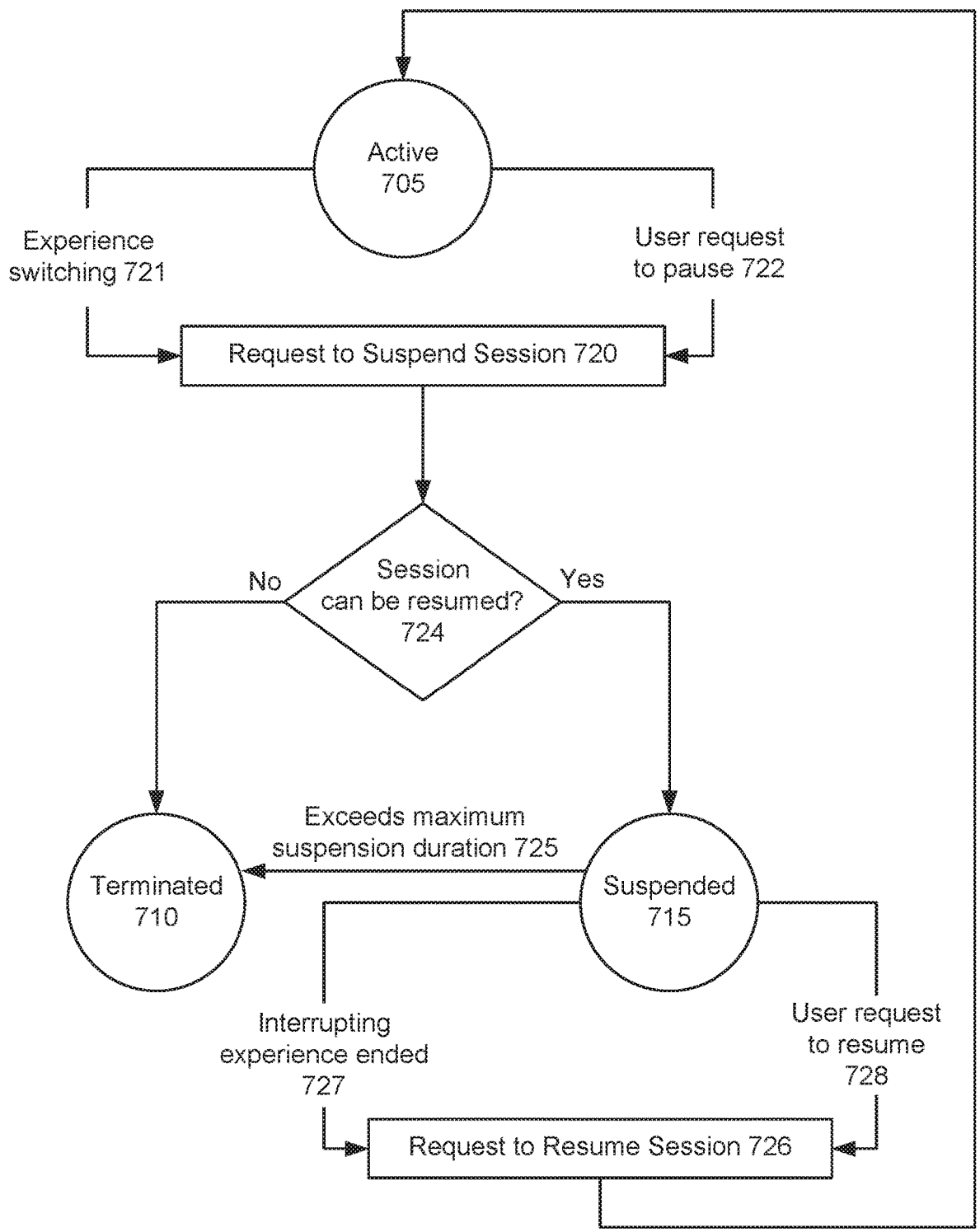
FIG. 7 is a conceptual diagram illustrating how a system manages the various states of a session according to embodiments of the present disclosure.

FIG. 7 is a conceptual diagram illustrating how the system 100 manages the various states of a session for a skill/experience according to embodiments of the present disclosure. The states of the session may include active 705, terminated 710 and suspended 715. In an example embodiment, the session manager component 285 is configured to manage the states of the session. As illustrated in FIG. 7, while a session is in the active state 705, there are two ways to suspend the session. One is when a switch in skill/experience (721) is needed to respond to a user request. For example, while interacting with the trivia skill, the user may say "what time is it?" and the system 100 may determine that another skill (not the currently active trivia skill) needs to be invoked to respond to the user's request. The other way to suspend the session is when the user explicitly requests to pause (722) the session. For example, while interacting with the Jeopardy skill, the user may say "Alexa, pause trivia," and the system 100 determines, in response, that the session corresponding to the trivia skill needs to be suspended. In both cases, the system 100 executes a request to suspend session (720). The system 100 may send a message to the skill (e.g., a skill system 125 associated with the active skill) indicating that there is request to suspend the session corresponding to the skill (720), and the skill may respond with a message indicating whether the skill is capable of being suspended. The message from the skill may also include a duration of time within which the skill can be resumed.

The system 100 determines if the session can be resumed (724) based on the message received from the skill and/or other data available to the system 100. If the session cannot be resumed, then the session is placed in the terminated state 710. If the session can be resumed, then the session is placed in the suspended state 715.

From the suspended state 715, the session can move back to the active state 705 in two ways. One is when the skill/experience that interrupted the session has ended (727). For example, the interrupting skill/experience may end when the system 100 has caused the device 110 to output the time in response to the user request "what is time is it?" The system associated with the interrupting skill/experience may send a message to the system 100 indicating that it has provided its output and that the corresponding session can be terminated. The other way the session can move back to the active state 705 is when the system 100 receives an explicit request from the user to resume the session (728). For example, the user may say "Alexa, resume trivia," and the system 100, in response, places the session in the active state 705. In both cases, the system 100 executes a request to resume the session (726) causing the session to be placed in the active state 705, and the user can continue interacting with the skill corresponding to the session. The system 100 may send a message to the skill indicating the request to resume the session.

If the session has been suspended for too long, such that the suspension exceeds the maximum duration that the skill specified it can be resumed within, (725) then the session is moved to the terminated state 710 and is not be resumed.

FIG. 8A is a signal flow diagram illustrating how a user request requiring invocation of a skill is processed according to embodiments of the present disclosure. The orchestrator 230 may send (802) audio data to the ASR component 250. The audio data may represent an utterance spoken by a user, for example, "Alexa, start trivia." The ASR component 250 may determine text data corresponding to the audio data, as described above, and may send (804) text data to the orchestrator 230. The orchestrator 230 may send (806) the text data and other related data to the NLU component 260.

As described above, the NLU component 260 may determine a N-best list consisting of NLU hypotheses corresponding to the text data. The NLU component 260 may send (808) the NLU data consisting of the N-best list to the orchestrator 230, and the orchestrator 230 may send (810) the NLU data to the post-NLU ranker 265. As described above, the post-NLU ranker 265 may process the NLU data and select a skill to execute the user's request represented in the audio data. The post-NLU ranker 265 may send (812) an indication of which skill it selected to the orchestrator 230.

The orchestrator 230 may send (814) an instruction to the session manager component 285 to start a session with the selected skill. The session manager component 285 may generate (815) a first data record (e.g., 626) including a first session identifier, a skill identifier (e.g., a name, an alphanumeric identifier, or other kind of identifier identifying the selected skill), and status data. The session manager component 285 may set the status data associated with the first data record as active to indicate that the session corresponding to the selected skill is active. The session manager component 285 may send (818) a request, including the first session identifier, to the request router component 610 to invoke the selected skill. The request router component 610 may send (820) a request, including the first session identifier, to the selected skill (e.g., skill 290a) to launch.

FIG. 8B is a signal flow diagram illustrating how a user request requiring pausing of a skill is processed according to embodiments of the present disclosure. The orchestrator 230 may send (822) audio data to the ASR component 250. The audio data may represent a subsequent utterance from the user, for example, "what is the time?" or "pause trivia." The ASR component 250 may determine text data corresponding to the audio data, as described above, and may send (824) text data to the orchestrator 230. The orchestrator 230 may send (826) the text data and other related data to the NLU component 260.

As described above, in the improved system the NLU component 260 may determine a mixed N-best list consisting of NLU hypotheses associated with the first type of intents and the second type of intents. The NLU component 260 may send (828) the NLU data consisting of the mixed N-best list to the orchestrator 230, and the orchestrator 230 may send (830) the NLU data to the post-NLU ranker 265. As described above, in the improved system the post-NLU ranker 265 may process the NLU data and may determine that the user's intent is to pause the current skill (because of an explicit instruction to pause or because the user's request requires invoking another skill). The post-NLU ranker 265 may send (832) an indication of the intent to pause the skill to the orchestrator 230.

The orchestrator 230 may send (834) the intent to pause the skill to the session manager component 285. The session manager component 285 may process the intent to pause the skill and determine that the currently active skill session needs to be suspended/paused. The session manager component 285 may set (835) the status data associated with the first data record to suspend to indicate that the corresponding session is in the suspended state. The session manager component 285 may send (836) an instruction, including the first session identifier, the request router component 610 to suspend the skill 290a. The request router component 610 may send (838) a message, including the first session identifier, to the skill 290a indicating that there was a request to suspend the corresponding session and skill. In some embodiments, the orchestrator 230 may also send an instruction to the device 110 to close or deactivate device's 110 microphone in response to the session manager component 285 suspending the skill session.

The skill 290a may send (840) a response to the request router component 610 including resumption data. The request router component 610 may send (842) the resumption data to the session manager component 285. The session manager component 285 may store the resumption data (as other data) in the first data record associated with the session.

The resumption data may include the flag "shouldEndSession" which represents the skill's response on whether the session should be terminated or not. In this example, the skill 290a may indicate that the session should not be terminated ("shouldEndSession"=false) because the skill 290a is capable of pausing and resuming the session. The resumption data may also include a duration of time for which the skill can resume the session. For example, if the skill 290a is the trivia skill, then the skill may be capable of resuming the session (that is, the current game) within an hour of pausing. As another example, if the skill 290a is the music playback skill (e.g., Spotify or Pandora), then the skill may be capable of resuming the session in 24 hours. The resumption data may also identify one or more resources requested by the skill 290a to resume the skill session, and may also include other data regarding the requested resources.

Figure 8C:
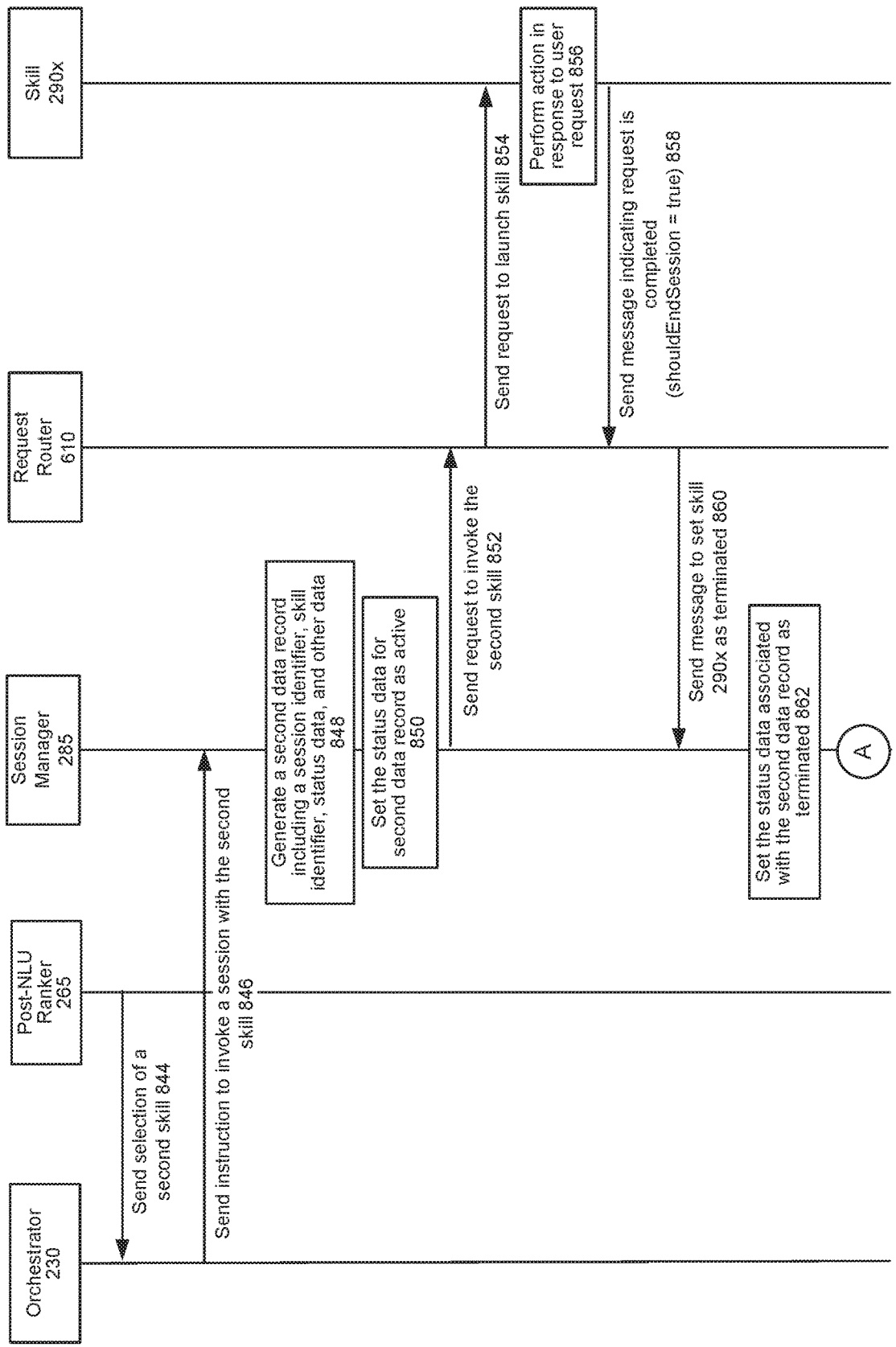
FIG. 8C is a signal flow diagram illustrating how a user request requiring invocation of another skill is processed according to embodiments of the present disclosure.

FIG. 8C is a signal flow diagram illustrating how a user request requiring invocation of another skill is processed according to embodiments of the present disclosure. In the case where the user request represented in the audio data (from step 822) requires invocation of another skill, the post-NLU ranker 265 may send (844) an indication of selecting a second skill to process the user request. In some embodiments, the post-NLU ranker 265 may send the indication of the second skill in step 832 along with the intent to pause the first skill. In other embodiments, the session manager component 285 may determine that because the post-NLU ranker 265 selected a second skill to process the incoming user request, the active skill session corresponding to the first skill needs to be paused or suspended. The orchestrator 230 may send (846) an instruction to the session manager component 265 to invoke a session with the second skill.

The session manager component 265 may generate (848) a second data record (e.g., 627) including a second session identifier (identifying a new session), a skill identifier (identifying the second skill), and status data. The session component manager 265 may set (850) the status data for the second data record as active to indicate that the session corresponding to the second skill is in an active state. The session manager component 265 may send (852) a request including the second session identifier, to the request router component 610 to invoke the second skill.

The request router runtime component 610 may send (854) a request, including the second session identifier, to launch the second skill (e.g., skill 290x). The skill 290x may perform (856) one or more actions in response to the user request and may send data and receive data (not shown) from various components of the system 100 to output data in response to the user request. Once the action is completed, the skill 290x may send (858) a message to the request router component 610 indicating that the user request is complete and that the corresponding session can be terminated ("shouldEndSession"=true).

The request router component 610 may send (860) a message to the session skill manager component 285 to set the session corresponding to the skill 290x as terminated. The session skill manager component 285 may set (862) the status data associated with the second data record as terminated to indicate that the corresponding session in a terminated state.

FIG. 8D is a signal flow diagram illustrating how a skill is resumed according to embodiments of the present disclosure. The session manager component 285 may determine (864) whether the session corresponding to the first skill (e.g., skill 290a) can be resumed based on the data stored in the first data record (the data indicating the resumption data provided by the skill 290a in step 842). If the session cannot be resumed, then the session manager component 285 may set (866) the status data associated with the first data record as terminated to indicate that the corresponding session is in a terminated state. If the session can be resumed, the session manager component 285 may set (868) the status data associated with the first data record as active to indicate that the corresponding session is in an active state. The session manager component 285 may send (870) a request, including the first session identifier, to the request router component 610 to resume the first skill 290a. The request router component 610 may send (872) a request, including the first session identifier, to the skill 290a to resume the skill.

In some embodiments, the system 100 may allow a user to interact with the second skill via multiple turns before terminating the session. For example, while interacting with the trivia skill, the user may say "what is today's weather?" and the system 100 may perform the functionalities above and cause the device 110 to output "it is sunny, with a high of . . . ." In a subsequent utterance, the user may say "what is the current temperature?" and the system 100 may cause the device 110 to output "it is currently 70 degrees." To achieve this, the system 100 and/or the second skill 290x may be configured to wait for a duration of time before determining that the session corresponding to the second skill should be terminated.

Figure 9B:
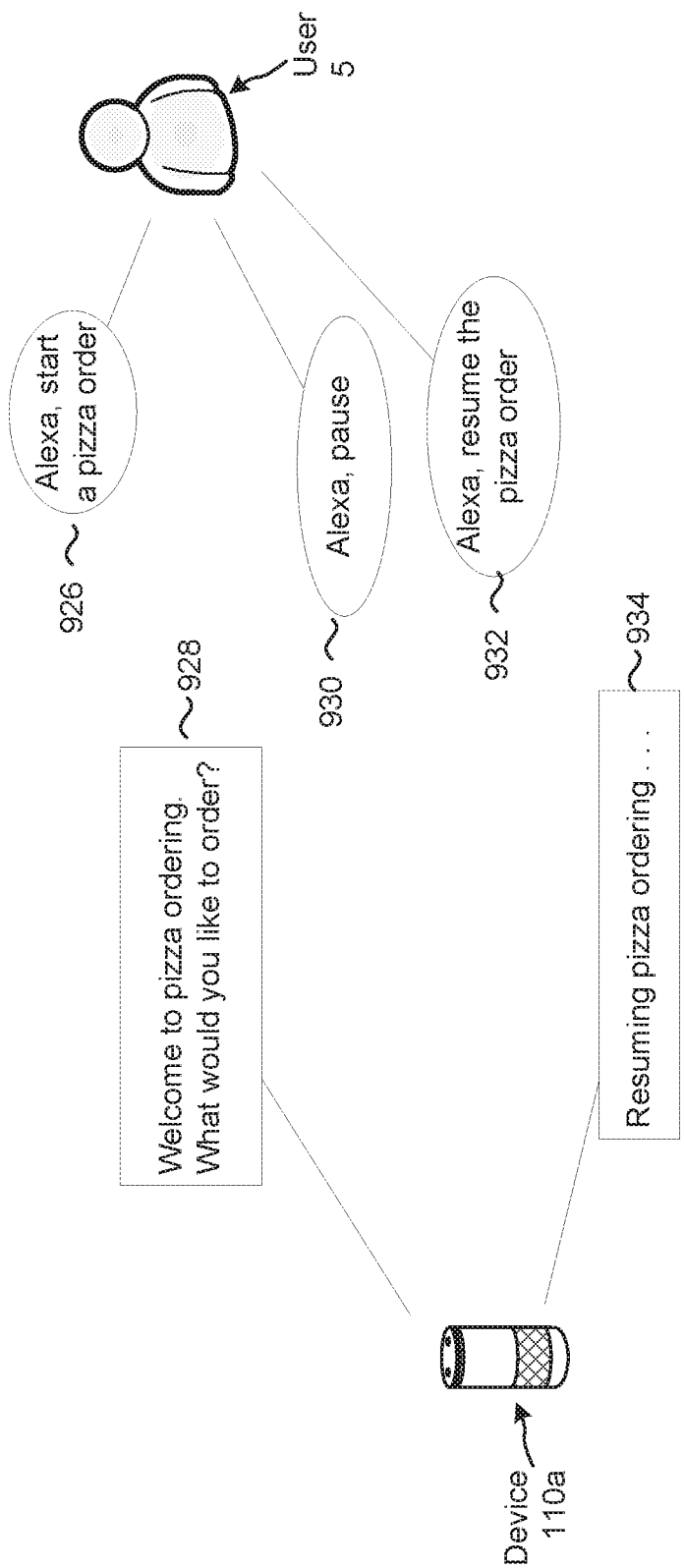

FIGS. 9A and 9B illustrate a user interaction with a system according to embodiments of the present disclosure. As illustrated in FIG. 9A, a user 5 may interact with the device 110 and say "Alexa, open trivia game" (e.g., utterance 910). The device 110 may respond "This is trivia . . . " (e.g., output audio 912) and "The first category is . . . " (e.g., output audio 914). While the current session with the trivia skill is ongoing, the user 5 may say "what is the time?" (e.g., utterance 916). The system 100, as described above, may determine that the user 5 intends to know the time requiring invocation of another skill and that the user 5 is not intending to provide an answer to a trivia question or intending to interact with the trivia skill. The system 100, thus causes the device 110 to output "Its 11 AM" (e.g., output audio 918). In this example, the system 100 determines to automatically resume the previous skill—the trivia skill, and the device 110 outputs "Resuming trivia . . . The first category is . . . " (e.g., output audio 920).

As illustrated in FIG. 9B, the user 5 may interact with the device 110 and say "Alexa, start a pizza order" (e.g., utterance 926). The device 110 may respond "Welcome to pizza ordering. What would you like to order?" (e.g., output audio 928). While the current session with the pizza ordering skill is ongoing, the user 5 may say "Alexa, pause" (e.g., utterance 930). The system 100, as described above, may determine that the user 5 intends to pause the interaction. In some cases, the system 100 may cause the device 110 to deactivate the microphone associated with the device 110 until a wakeword is detected. The user 5 may then say "Alexa, resume the pizza order" (e.g., utterance 932), and the system 100 causes the device 110 to output "Resuming pizza ordering" (e.g., output audio 934) in response to the user request to resume.

Figure 10:
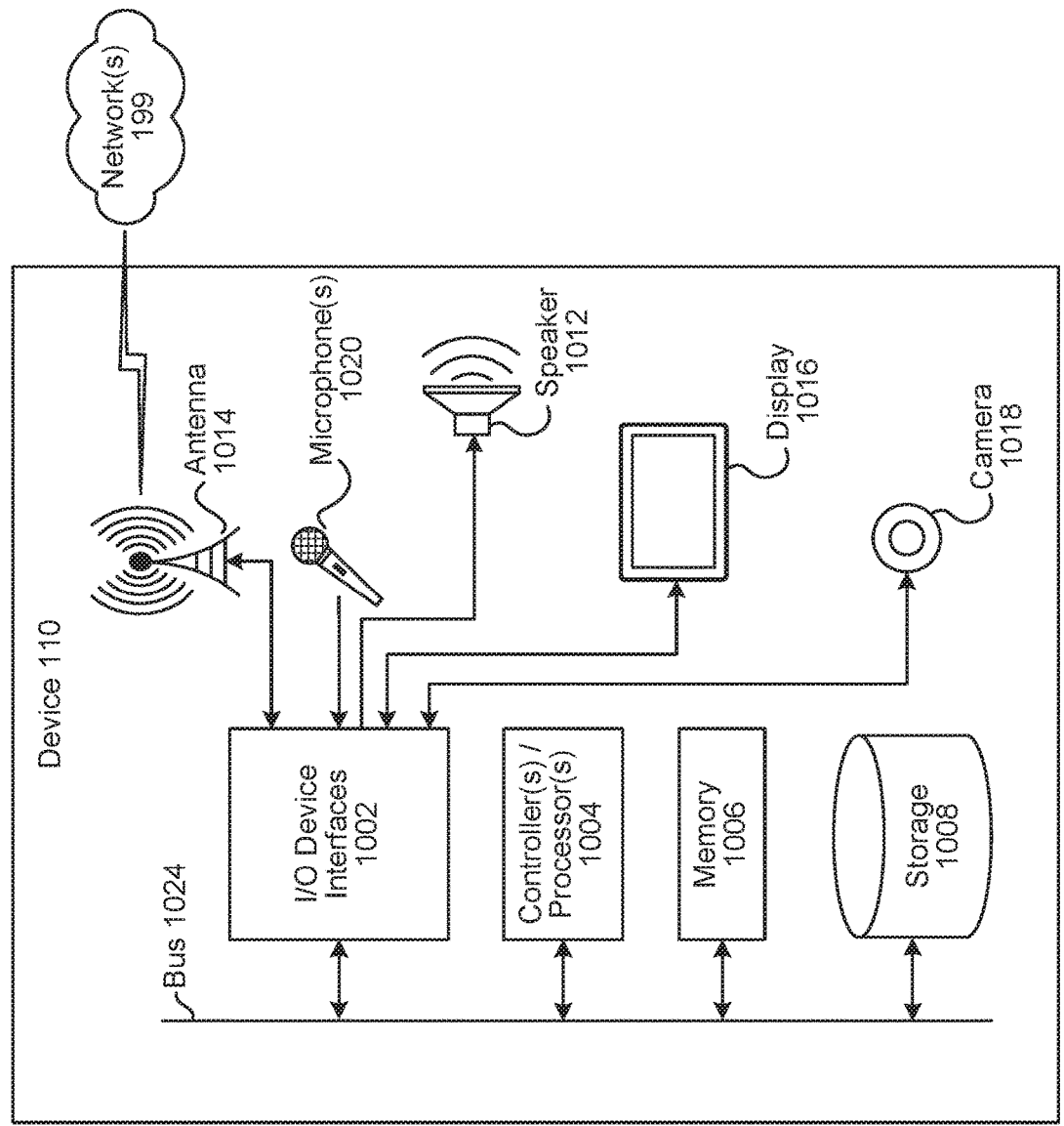
FIG. 10 is a block diagram conceptually illustrating example components of a device according to embodiments of the present disclosure.
Figure 11:
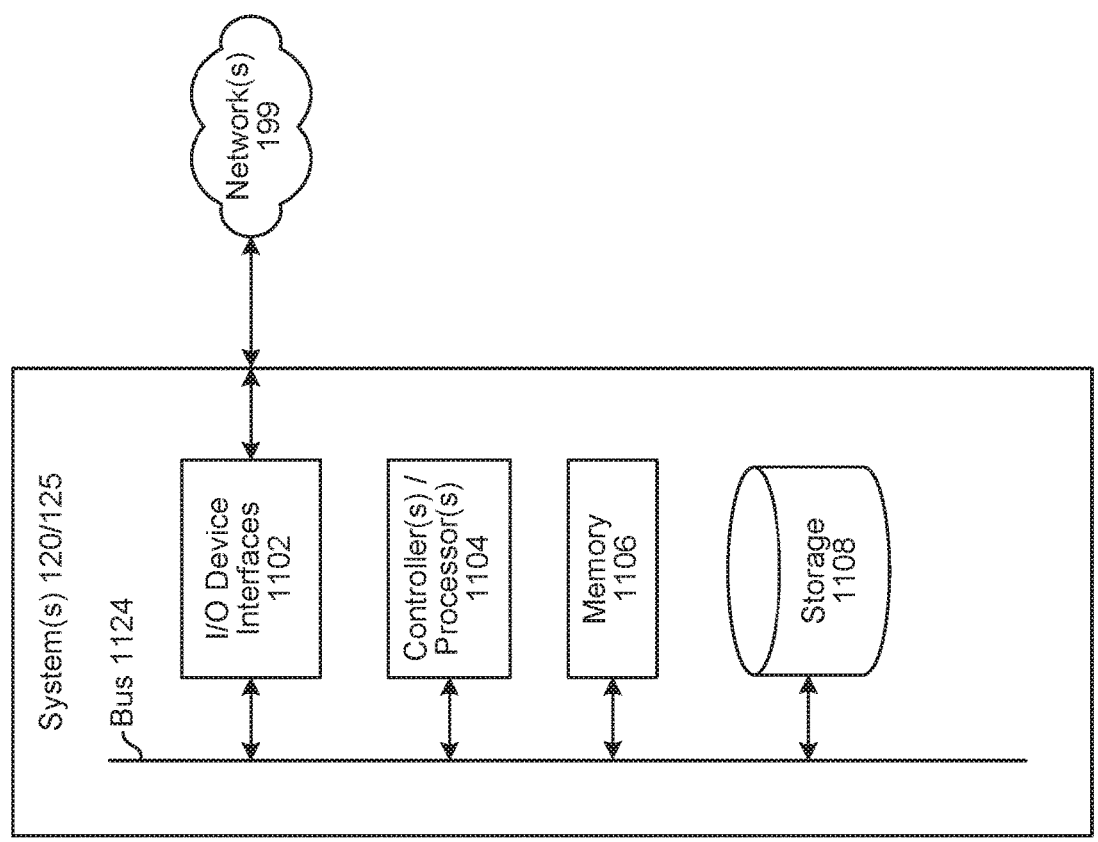
FIG. 11 is a block diagram conceptually illustrating example components of a server according to embodiments of the present disclosure.

FIG. 10 is a block diagram conceptually illustrating a device 110 that may be used with the system. FIG. 11 is a block diagram conceptually illustrating example components of a remote device, such as the system(s) 120, which may assist with ASR processing, NLU processing, etc., and the skill system(s) 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the overall system of the present disclosure, such as one or more systems 120 for performing ASR processing, one or more systems 120 for performing NLU processing, one or more skill systems 125 for performing actions responsive to user inputs, etc. In operation, each of these systems may include computer-readable and computer-executable instructions that reside on the respective device (120/125), as will be discussed further below.

Each of these devices (110/120/125) may include one or more controllers/processors (1004/1104), which may each include a central processing unit (CPU) for processing data and computer-readable instructions, and a memory (1006/1106) for storing data and instructions of the respective device. The memories (1006/1106) may individually include volatile random access memory (RAM), non-volatile read only memory (ROM), non-volatile magnetoresistive memory (MRAM), and/or other types of memory. Each device (110/120/125) may also include a data storage component (1008/1108) for storing data and controller/processor-executable instructions. Each data storage component (1008/1108) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1002/1102).

Computer instructions for operating each device (110/120/125) and its various components may be executed by the respective device's controller(s)/processor(s) (1004/1104), using the memory (1006/1106) as temporary "working" storage at runtime. A device's computer instructions may be stored in a non-transitory manner in non-volatile memory (1006/1106), storage (1008/1108), or an external device(s). Alternatively, some or all of the executable instructions may be embedded in hardware or firmware on the respective device in addition to or instead of software.

Each device (110/120/125) includes input/output device interfaces (1002/1102). A variety of components may be connected through the input/output device interfaces (1002/1102), as will be discussed further below. Additionally, each device (110/120/125) may include an address/data bus (1024/1124) for conveying data among components of the respective device. Each component within a device (110/120/125) may also be directly connected to other components in addition to (or instead of) being connected to other components across the bus (1024/1124).

Referring to FIG. 10, the device 110 may include input/output device interfaces 1002 that connect to a variety of components such as an audio output component such as a speaker 1012, a wired headset or a wireless headset (not illustrated), or other component capable of outputting audio. The device 110 may also include an audio capture component. The audio capture component may be, for example, a microphone 1020 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1016 for displaying content. The device 110 may further include a camera 1018.

Via antenna(s) 1014, the input/output device interfaces 1002 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1002/1102) may also include communication components that allow data to be exchanged between devices such as different physical servers in a collection of servers or other components.

The components of the device(s) 110, the system(s) 120, or the skill system(s) 125 may include their own dedicated processors, memory, and/or storage. Alternatively, one or more of the components of the device(s) 110, the system(s) 120, or the skill system(s) 125 may utilize the I/O interfaces (1002/1102), processor(s) (1004/1104), memory (1006/1106), and/or storage (1008/1108) of the device(s) 110 system(s) 120, or the skill system(s) 125, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system(s) 120, and the skill system(s) 125, as described herein, are illustrative, and may be located as a stand-alone device or may be included, in whole or in part, as a component of a larger device or system.

Figure 12:
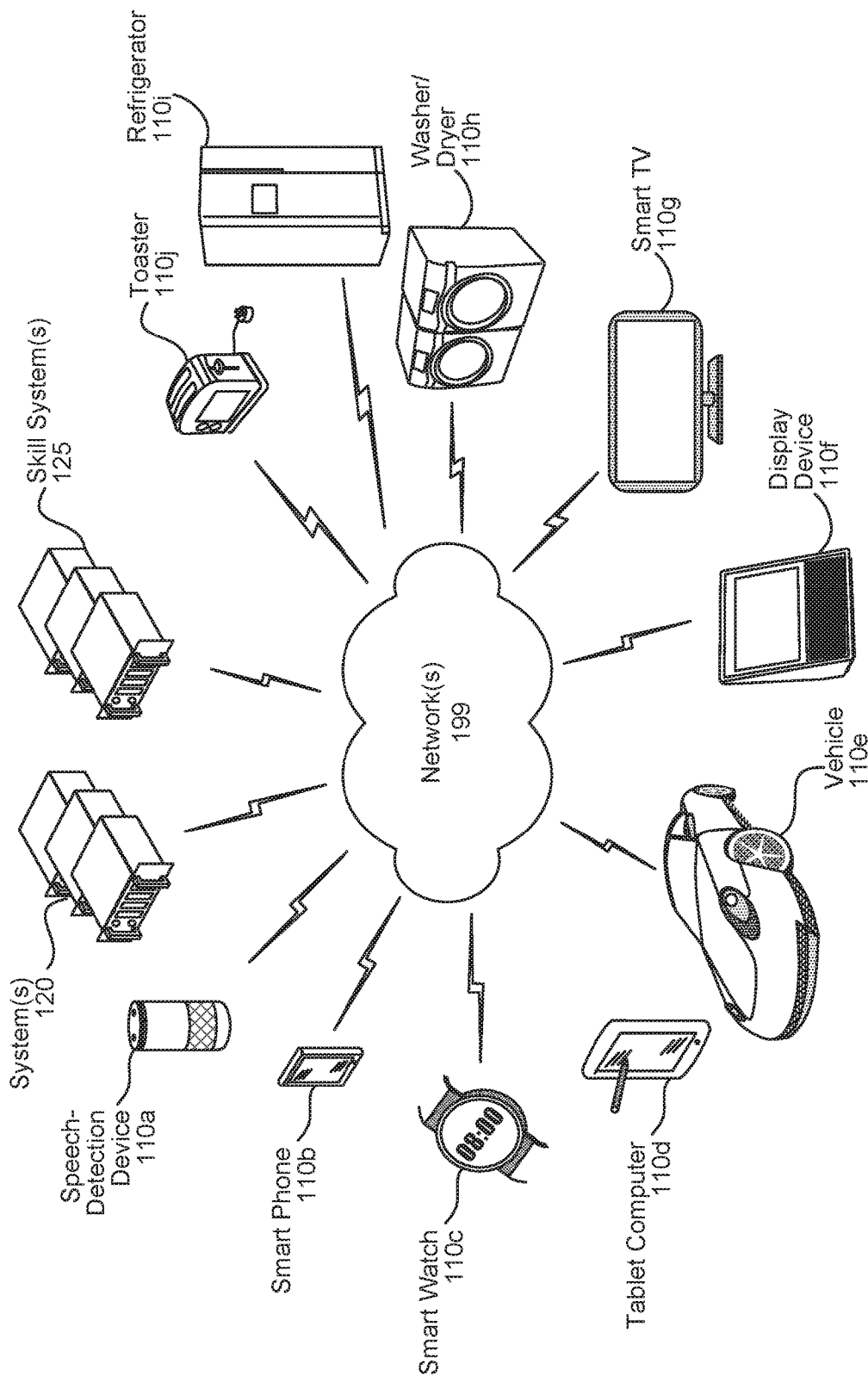
FIG. 12 illustrates an example of a computer network for use with the speech processing system.

As illustrated in FIG. 12, multiple devices (110a-110j, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a toaster 110j may be connected to the network(s) 199 through a wireless service provider, over a WiFi or cellular network connection, or the like. Other devices are included as network-connected support devices, such as the system(s) 120, the skill system(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more systems 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer implemented method comprising:
receiving first audio data representing a first utterance, the first utterance associated with a user profile;
performing speech processing using the first audio data to determine a first intent represented by the first utterance;
determining a first skill to execute the first intent;
generating a first data record for monitoring a beginning and an end of a first skill session corresponding to the first utterance, the first data record including a first skill session identifier and a first skill identifier representing the first skill;
sending the first skill session identifier and an indicator of the first intent to a first component associated with the first skill;
associating first status data with the first data record, the first status data indicating the first skill session is active with respect to the user profile;
receiving second audio data representing a second utterance, the second utterance associated with the user profile;

performing speech processing using the second audio data to determine a second intent represented by the second utterance;
determining a second skill to execute the second intent;
generating a second data record for monitoring a beginning and an end of a second skill session corresponding to the second utterance, the second data record including a second skill session identifier and a second skill identifier representing the second skill;
sending the second skill session identifier and a second indicator of the second intent to a second component associated with the second skill;
associating second status data with the first data record, the second status data indicating that the first skill session is suspended with respect to the user profile;
associating third status data with the second data record, the third status data indicating the second skill session is active with respect to the user profile;
receiving, from the second component, a first message indicating completion of execution with respect to the second intent;
sending, to the first component, a second message indicating resumption of the first skill session, the second message including the first skill session identifier; and
associating fourth status data with the first data record, the fourth status data indicating that the first skill session is active with respect to the user profile.

2. The computer implemented method of claim 1, further comprising:
determining that the second intent results in interrupting the first skill session;
determining, using stored policy data, that the first skill session is capable of being interrupted, the stored policy data indicating at least one of: when the first skill session is capable of being interrupted, an engagement level corresponding to the first skill session, or a type resource used by the first skill session; and
sending a third message to the first component indicating that the first skill session is being suspended with respect to the user profile, the third message including the first skill session identifier.

3. The computer implemented method of claim 1, further comprising:
sending a third message to the first component indicating that the first skill session is being suspended with respect to the user profile, the third message including the first skill session identifier;
receiving, from the first component, resumption data indicating a duration of time within which the first skill session is capable of being resumed;
storing a first time representing when the second status data is associated with the first data record;
storing a second time representing when the first message is received;
determining time lapsed based on the first time and the second time; and
determining that the first skill session is capable of being resumed based at least in part on the duration of time and the time lapsed,
wherein sending the second message comprises sending the second message in response to determining that the first skill session is capable of being resumed.

4. The computer implemented method of claim 1, further comprising:
storing association data indicating that the first skill session was interrupted by the second skill session; and
associating fifth status data with the second data record, the fifth status data indicating that the second skill session is terminated, the associating in response to receiving the first message;
wherein sending the second message comprises:
determining, using the association data, that the first skill session was interrupted by the second skill session;
determining, using the fifth status data, that the second skill session is terminated; and
generating the second message in response to determining that the second skill session is terminated.

5. A computer-implemented method comprising:
identifying a first data record corresponding to a first skill session, the first data record including a first skill session identifier and a first skill identifier associated with a first skill;
determining that first status data associated with the first data record indicates that the first skill session is suspended;
receiving an indication to resume the first skill session;
sending, to a first component associated with the first skill, a first message indicating resumption of the first skill session, the first message including the first skill session identifier; and
associating second status data with the first data record, the second status data indicating that the first skill session is active.

6. The method of claim 5, wherein receiving the indication comprises:
receiving audio data representing an utterance associated with a user profile;
processing the audio data using automatic speech recognition (ASR) to determine text data; and
performing natural language understanding (NLU) on the text data to determine an intent to resume the first skill session with respect to the user profile,
wherein receiving the indication to resume the first skill session comprises receiving the intent.

7. The method of claim 5, wherein receiving the indication comprises:
identifying a second data record corresponding to a second skill session;
determining that third status data associated with the second data record indicates that the second skill session is terminated; and
determining that the first skill session was interrupted by the second skill session,
wherein associating the second status data with the first data record occurs in response to determining that the third status data indicates the second skill session is terminated and determining that the first skill session was interrupted by the second skill session.

8. The method of claim 5, further comprising:
receiving, from the first component, a time period within which the first skill session is capable of being resumed;
determining a duration of time between when the first status data is set to suspended and when the indication to resume the first skill session is received; and
determining that, based at least in part on the duration of time, the first skill session is capable of being resumed.

9. The method of claim 5, further comprising:
receiving input data associated with a user profile;
determining that the input data corresponds to the first skill session;

determining that the second status data indicates that the first skill session is active; and sending the input data to the first component based at least in part on determining that the first skill session is active.

10. The method of claim 5, further comprising prior to identifying the first data record:

receiving input data associated with a user profile;

determining that the input data represents an intent that results in interruption of the first skill session;

identifying second status data associated with the first data record, the second status data indicating the first skill session is active with respect to the user profile; and associating the first status data with the first data record, the first status data indicating the first skill session is suspended with respect to the user profile.

11. The method of claim 10, further comprising:

sending, to the first component, a first message indicating that the first skill session is being suspended, the first message including the first skill session identifier;

receiving, from the first component, resumption data indicating at least a capability of the first skill session to resume; and associating the first status data with the first data record in response based at least in part on the resumption data.

12. The method of claim 5, further comprising:

receiving, from the first component, resumption data indicating at least one of a capability to resume the first skill session and a duration of time within which to resume the first skill session;

determining, using the resumption data, that the first skill session cannot be resumed; and associating third status data with the first data record, the third status data indicating that the first skill session is terminated.

13. The method of claim 5, further comprising:

identifying the second status data associated with the first skill session identifier;

based at least in part on identifying the second status data associated with the first skill session identifier, causing resumption of the first skill session.

14. A system comprising:

at least one processor; and at least one memory including instructions that, when executed by the at least one processor, cause the system to:

identify first status data indicating that a first skill session, associated with a first skill session identifier, is active;

receive an indication to interrupt the first skill session;

store second status data indicating the first skill session, associated with the first skill session identifier, is suspended;

store third status data indicating a second skill session corresponding to a second skill is active;

send, to a first component associated with the second skill, an instruction to perform a task;

receive, from the first component, a first message indicating completion of the task; and store fourth status data indicating the second skill session is terminated.

15. The system of claim 14, wherein the instructions that, when executed by the at least one processor, further cause the system to:

determine, using stored policy data, that the first skill session is capable of being interrupted, the stored policy data indicating at least one of: when the first skill session is capable of being interrupted, an engagement level corresponding to the first skill session, or a type resource used by the first skill session; and send, to a second component associated with a first skill, a second message indicating that the first skill session is being suspended.

16. The system of claim 14, wherein the instructions that, when executed by the at least one processor, cause the system to receive the indication further causes the system to:

receive audio data representing an utterance associated with a user profile;

process the audio data using automatic speech recognition (ASR) to determine text data;

perform natural language understanding (NLU) on the text data to determine an intent; and determine the second skill to execute the intent, wherein the instructions that, when executed by the at least one processor, cause the system to receive the indication further cause the system to receive the intent.

17. The system of claim 14, wherein the instructions that, when executed by the at least one processor, cause the system to receive the indication further causes the system to:

receive, from the first component, notification data corresponding to the second skill, wherein the instructions that, when executed by the at least one processor, cause the system to receive the indication further cause the system to receive the notification data.

18. The system of claim 14, wherein the instructions that, when executed by the at least one processor, further cause the system to:

generate a second message indicating that the first skill session is being suspended, the second message including the first skill session identifier associated with the first status data; and send, to a second component associated with a first skill, the second message in response to storing the second status data.

19. The system of claim 14, wherein the instructions that, when executed by the at least one processor, further cause the system to:

store association data indicating that the first skill session was interrupted by the second skill session;

generate a second message based at least in part on the association data and the fourth status data, the second message indicating resumption of the first skill session; and send, to a second component associated with a first skill, the second message indicating resumption of the first skill session.

20. The system of claim 19, wherein the instructions that, when executed by the at least one processor, further cause the system to:

receive, from the second component associated with a first skill, resumption data indicating at least one of a capability to resume the first skill session and a duration of time within which the first skill session is capable of being resumed;

determine, using the resumption data, that the first skill session is capable of being resumed; and store fifth status data indicating that the first skill session is active.

21. The system of claim 14, wherein the instructions that, when executed by the at least one processor, further cause the system to:

receive, from a second component associated with a first skill, resumption data indicating at least one of a capability to resume the first skill session and a duration of time within which the first skill session is capable of being resumed;

determine, using the resumption data, that the first skill session cannot be resumed; and store fifth status data indicating that the first skill session is terminated.

22. The system of claim 14, wherein the instructions that, when executed by the at least one processor, further cause the system to:

generate a first data record indicating that the first skill session was interrupted by a second skill session corresponding to a second skill session identifier.

* * * * *